US011978380B2

(12) United States Patent
Qiu et al.

(10) Patent No.: US 11,978,380 B2
(45) Date of Patent: May 7, 2024

(54) PIXEL DRIVING CIRCUIT, DRIVING METHOD THEREOF, DISPLAY SUBSTRATE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yuanyou Qiu, Beijing (CN); Yao Huang, Beijing (CN)

(73) Assignees: CHENGDU BOE OPTOELECTRONICS TECHNOLOGY CO., LTD., Sichuan Province (CN); BOE TECHNOLOGY GROUP CO., LTD., Beijing (CN)

( * ) Notice: Subject to any disclaimer, the term of this patent is extended or adjusted under 35 U.S.C. 154(b) by 117 days.

(21) Appl. No.: 17/426,681

(22) PCT Filed: Oct. 12, 2020

(86) PCT No.: PCT/CN2020/120484

§ 371 (c)(1),
(2) Date: Jul. 29, 2021

(87) PCT Pub. No.: WO2022/067877

PCT Pub. Date: Apr. 7, 2022

(65) Prior Publication Data

US 2022/0319421 A1 Oct. 6, 2022

(51) Int. Cl.

*G09G 3/30* (2006.01)
*G09G 3/20* (2006.01)
*G09G 3/3233* (2016.01)

(52) U.S. Cl.

CPC ......... *G09G 3/2092* (2013.01); *G09G 3/3233* (2013.01); *G09G 2300/0426* (2013.01);

(Continued)

(58) Field of Classification Search

CPC ......... G09G 3/3233; G09G 2300/0842; G09G 2300/0861; G09G 2310/08;

(Continued)

(56) References Cited

U.S. PATENT DOCUMENTS

2010/0079361 A1 4/2010 Lee et al.
2012/0038605 A1 2/2012 Han (Continued)

FOREIGN PATENT DOCUMENTS

CN 103778883 A 5/2014
CN 104409047 A 3/2015

(Continued)

OTHER PUBLICATIONS

Office Action for Chinese Application No. 202080002169.4 dated Apr. 22, 2023.

(Continued)

*Primary Examiner* — Roy P Rabindranath
(74) *Attorney, Agent, or Firm* — ArentFox Schiff LLP; Michael Fainberg

(57) ABSTRACT

The display substrate includes a plurality of pixel driving circuits correspondingly coupled to second light-emitting devices, respectively. The pixel driving circuit includes a first drive control circuit in the bezel area, and a second drive control circuit in the second display area. The first drive control circuit is coupled to the second drive control circuit through first wire, and the second drive control circuit is coupled to a corresponding second light-emitting device. Each first drive control circuit is configured to generate a drive current for driving the corresponding second light-emitting device. Each second drive control circuit is configured to make the path between the first drive control circuit and the corresponding second light-emitting device conducting after the path being non-conducting for a period (Continued)

of time, when the drive current moves between the second drive control circuit and the first wire.

19 Claims, 9 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2330/028* (2013.01); *G09G 2360/145* (2013.01)

(58) Field of Classification Search
CPC ......... G09G 2320/0233; G09G 3/2092; G09G 2300/0426; G09G 2300/0819; G09G 2330/028; G09G 2360/145
See application file for complete search history.

(56) References Cited

U.S. PATENT DOCUMENTS

| | | | |
|---|---|---|---|
| 2015/0187273 A1 | 7/2015 | Chang et al. | |
| 2016/0171930 A1 | 7/2016 | Song et al. | |
| 2016/0314742 A1 | 10/2016 | Zhou | |
| 2017/0069263 A1 | 3/2017 | Hu | |
| 2017/0270867 A1 | 9/2017 | Zhu et al. | |
| 2018/0025696 A1* | 1/2018 | Su | G09G 5/003 345/213 |
| 2018/0090067 A1* | 3/2018 | Oh | G09G 3/3258 |
| 2019/0377923 A1 | 12/2019 | Chen et al. | |
| 2020/0066212 A1 | 2/2020 | Kim et al. | |
| 2020/0169680 A1 | 5/2020 | Park et al. | |
| 2020/0319682 A1 | 10/2020 | Moon et al. | |
| 2020/0358379 A1 | 11/2020 | Chen et al. | |
| 2021/0118371 A1 | 4/2021 | Qing et al. | |
| 2021/0158750 A1 | 5/2021 | Xiang et al. | |
| 2021/0201762 A1 | 7/2021 | He | |
| 2021/0287603 A1 | 9/2021 | Liu et al. | |
| 2021/0304663 A1* | 9/2021 | Kim | G09G 3/3275 |
| 2021/0327972 A1 | 10/2021 | Lou et al. | |
| 2021/0407436 A1 | 12/2021 | Park et al. | |
| 2022/0139335 A1 | 5/2022 | Lee et al. | |

FOREIGN PATENT DOCUMENTS

| | | | |
|---|---|---|---|
| CN | 104751784 | A | 7/2015 |
| CN | 106157880 | A | 11/2016 |
| CN | 106531074 | A | 3/2017 |
| CN | 106991964 | A | 7/2017 |
| CN | 107564470 | A | 1/2018 |
| CN | 107610635 | A | 1/2018 |
| CN | 108492782 | A | 9/2018 |
| CN | 108806578 | A | 11/2018 |
| CN | 109215582 | A | 1/2019 |
| CN | 110047432 | A | 7/2019 |
| CN | 110767157 | A | 2/2020 |
| CN | 110858471 | A | 3/2020 |
| CN | 111028757 | A | 4/2020 |
| CN | 111063719 | A | 4/2020 |
| CN | 111179855 | A | 5/2020 |
| CN | 111326560 | A | 6/2020 |
| CN | 111402814 | A | 7/2020 |
| CN | 111508377 | A | 8/2020 |
| KR | 20160070642 | A | 6/2016 |
| KR | 20200060118 | A | 5/2020 |

OTHER PUBLICATIONS

Office Action for U.S. Appl. No. 17/441,716 dated Mar. 2, 2023.
Notice of Allowance for U.S. Appl. No. 17/441,716 dated Jun. 28, 2023.

* cited by examiner

--Prior Art--

PIXEL DRIVING CIRCUIT, DRIVING METHOD THEREOF, DISPLAY SUBSTRATE AND DISPLAY DEVICE

The disclosure is a US National Stage of International Application No. PCT/CN2020/120484, filed on Oct. 12, 2020, which claims priority to patent application No. PCT/CN2020/118657, filed on Sep. 29, 2020, and entitled "Display Panel, Driving Method of Pixel Circuit Therein, and Display Device", which is hereby incorporated by reference in its entirety.

FIELD

The disclosure relates to the field of display technology, particularly to a pixel driving circuit, a driving method thereof, a display substrate and a display device.

BACKGROUND

With rapid development of display technology, more requirements are proposed for shape of display devices in addition to the traditional function of information display and the like. Increasing screen-to-body ratio is a trend of the market, and therefore display devices with an under-panel camera are highly favored by consumers.

In a display device with an under-panel camera, the camera is provided under the panel, and light can pass through the display panel to the camera to enable the camera to capture a picture. However, uneven brightness at low gray scale easily occurs in the panel part where the camera is located.

SUMMARY

An embodiment of the disclosure provides a display substrate, including a display area and a bezel area, where the display area includes a first display area and a second display area, the first display area including a plurality of first light-emitting devices, and the second display area including a plurality of second light-emitting devices;

the display substrate includes a plurality of pixel driving circuits correspondingly coupled to the plurality of second light-emitting devices, respectively;

where the pixel driving circuits each comprises a first drive control circuit in the bezel area, and a second drive control circuit in the second display area, the first drive control circuit being coupled to the second drive control circuit through a first wire, and the second drive control circuit being coupled to a corresponding one of the plurality of second light-emitting devices;

each first drive control circuit is configured to generate a drive current for driving a corresponding one of the plurality of second light-emitting devices; and each second drive control circuit is configured to make a path between the first drive control circuit and the corresponding one of the plurality of second light-emitting devices conducting after the path being non-conducting for a period of time, when the drive current moves between the second drive control circuit and the first wire.

In some embodiments, in the embodiment of the disclosure, the first drive control circuit includes:

a first drive control sub-circuit, which is coupled to a first node, a second node, a third node, a first power terminal and a second power terminal, respectively, and configured to generate the drive current for driving the corresponding one of the plurality of second light-emitting devices according to signals of the first node, the second node and the third node;

a first threshold compensation sub-circuit, which is coupled to a first scanning signal terminal, the first node and the third node, respectively, and configured to perform threshold compensation on the first drive control sub-circuit under control of the first scanning signal terminal;

a first light emission control sub-circuit, which is coupled to the first power terminal, a fourth node, a first light emission control signal terminal, the second node and the third node, respectively, and configured to connect the first power terminal and the second node and connect the third node and the fourth node under control of the first light emission control signal terminal;

a first data writing sub-circuit, which is coupled to the first scanning signal terminal, a first data signal terminal and the second node, respectively, and configured to provide a data signal of the first data signal terminal to the second node under control of the first scanning signal terminal; and a first storage sub-circuit, which is coupled to the first power terminal and the first node, respectively, and configured to store data signals.

In some embodiments, in the embodiment of the disclosure, the first drive control sub-circuit includes a first switch transistor, the first switch transistor having a control terminal coupled to the first node, a first electrode coupled to the second node, and a second electrode coupled to the third node.

In some embodiments, in the embodiment of the disclosure, the first threshold compensation sub-circuit includes a second switch transistor, the second switch transistor having a control terminal coupled to the first scanning signal terminal, a first electrode coupled to the first node, and a second electrode coupled to the third node.

In some embodiments, in the embodiment of the disclosure, the first light emission control sub-circuit includes a third switch transistor and a fourth switch transistor, the third switch transistor having a control terminal coupled to the first light emission control signal terminal, a first electrode coupled to the first power terminal, and a second electrode coupled to the second node; and the fourth switch transistor having a control terminal coupled to the first light emission control signal terminal, a first electrode coupled to the third node, and a second electrode coupled to the fourth node.

In some embodiments, in the embodiment of the disclosure, the first data writing sub-circuit includes a fifth switch transistor, the fifth switch transistor having a control terminal coupled to the first scanning signal terminal, a first electrode coupled to the first data signal terminal, and a second electrode coupled to the second node.

In some embodiments, in the embodiment of the disclosure, the first storage sub-circuit includes a first capacitor, the first capacitor having a first electrode coupled to the first power terminal, and a second electrode coupled to the first node.

In some embodiments, in the embodiment of the disclosure, the first drive control circuit further includes a first reset sub-circuit and a second reset sub-circuit, the first reset sub-circuit being coupled to the first node, the first reset control terminal and a first reference signal terminal, respectively, and configured to provide a signal of the first reference signal terminal to the first node under the control of the first reset control terminal, and the second reset sub-circuit being coupled to the second light-emitting device, a second reset control terminal and a second reference signal terminal, respectively, and configured to provide a signal of the second reference signal terminal to the second light-emitting device under the control of the second reset control terminal; and the second drive control circuit includes:

a second light emission control sub-circuit being coupled to the first light emission control sub-circuit, the second light-emitting device and a second light emission control signal terminal, respectively, and configured to make the path between the first light emission control circuit and the second light-emitting device conducting under the control of the second light emission control signal terminal.

In some embodiments, in the embodiment of the disclosure, the first drive control circuit includes:

a first reset sub-circuit being coupled to the first node, a first reset control terminal and a first reference signal terminal, respectively, and configured to provide a signal of the first reference signal terminal to the first node under the control of the first reset control terminal; and the second drive control circuit includes a second reset sub-circuit and a second light emission control sub-circuit, the second reset sub-circuit being coupled to the second light-emitting device, a second reset control terminal and a second reference signal terminal, respectively, and configured to provide a signal of the second reference signal terminal to the second light-emitting device under the control of the second reset control terminal; and the second light emission control sub-circuit being coupled to the first light emission control sub-circuit, the second light-emitting device and a second light emission control signal terminal, respectively, and configured to make the path between the first light emission control circuit and the second light-emitting device conducting under the control of the second light emission control signal terminal.

In some embodiments, in an embodiment of the disclosure, the first reset sub-circuit includes a sixth switch transistor, the sixth switch transistor having a control terminal coupled to the first reset control terminal, a first electrode coupled to the first reference signal terminal, and a second electrode coupled to the first node.

In some embodiments, in an embodiment of the disclosure, the second reset sub-circuit includes a seventh switch transistor, the seventh switch transistor having a control terminal coupled to the second reset control terminal, a first electrode coupled to the second reference signal terminal, and a second electrode coupled to the second light-emitting device.

In some embodiments, in the embodiment of the disclosure, the second light emission control sub-circuit includes an eighth switch transistor, the eighth switch transistor having a control terminal coupled to the second light emission control signal terminal, a first electrode coupled to the first light emission control sub-circuit, and a second electrode coupled to the second light-emitting device.

In some embodiments, in the embodiment of the disclosure, the display substrate further includes a plurality of third drive control circuits correspondingly coupled to the first light-emitting devices, respectively, wherein the third drive control circuits are located in the first display area; and each third drive control circuit is configured to generate a drive current for driving the corresponding first light-emitting device.

In some embodiments, in the embodiment of the disclosure, the third drive control circuit includes:

a second drive control sub-circuit, which is coupled to a sixth node, a seventh node, an eighth node, a third power terminal and a fourth power terminal, respectively, and configured to generate a drive current for driving the first light-emitting device according to signals of the sixth node, the seventh node and the eighth node;

a second threshold compensation sub-circuit, which is coupled to a second scanning signal terminal, the sixth node and the eighth node, respectively, and configured to perform threshold compensation on the second drive control sub-circuit under the control of the second scanning signal terminal;

a third light emission control sub-circuit, which is coupled to the third power terminal, a fourth power terminal, a third light emission control signal terminal, the seventh node and the eighth node, respectively, and configured to couple the third power terminal to the seventh node, and couple the eighth node to the fourth power terminal, under the control of the third light emission control signal terminal;

a second data writing sub-circuit, which is coupled to the second scanning signal terminal, a second data signal terminal and the seventh node, respectively, and configured to provide a data signal of the second data signal terminal to the seventh node under the control of the second scanning signal terminal;

a second storage sub-circuit, which is coupled to the third power terminal and the sixth node, respectively, and configured to store data signals;

a third reset sub-circuit, which is coupled to the sixth node, the third reset control terminal and a third reference signal terminal, respectively, and configured to provide a signal of the third reference signal terminal to the sixth node under the control of the third reset control terminal; and a fourth reset sub-circuit, which is coupled to the first light-emitting device, a fourth reset control terminal and a fourth reference signal terminal, respectively, and configured to provide a signal of the fourth reference signal terminal to the first light-emitting device under the control of the fourth reset control terminal.

Correspondingly, an embodiment of the disclosure further provides a display device including any display substrate described above.

In some embodiments, in an embodiment provided in the disclosure, the display device further includes an image collector, where the image collector is located in the second display area of the display substrate, and the image collector is disposed on a side of the display substrate away from a light emergent surface.

Correspondingly, an embodiment of the disclosure further provides a pixel driving circuit, which is configured to drive a second light-emitting device, the pixel driving circuit including:

a first drive control circuit, which is configured to generate a drive current for driving the corresponding second light-emitting device; and a second drive control circuit, which is coupled to the first drive control circuit through a first wire, and coupled to the corresponding second light-emitting device; and configured to bring the first drive control circuit into conduction with the corresponding second light-emitting device after disconnecting the first drive control circuit from the corresponding second light-emitting device for a period of time, when the drive current is conducted between the second drive control circuit and the first wire.

Correspondingly, an embodiment of the disclosure further provides a driving method of the above-mentioned pixel driving circuit, the method including: in a first time period, controlling a first drive control circuit to generate a drive current for driving a corresponding second light-emitting device, and controlling the first drive control circuit to be disconnected from the corresponding second light-emitting device when the drive current moves between a second drive control circuit and a first wire; and in a second time period, controlling the path between the first drive control circuit and the corresponding second light-emitting device conducting.

In some embodiments, in the embodiment of the disclosure, in a first time period, controlling a first drive control circuit to generate a drive current for driving a corresponding second light-emitting device, and controlling the first drive control circuit to be disconnected from the corresponding second light-emitting device when the drive current moves to a node between a second drive control circuit and a first wire includes:

in a first sub-time period, applying an effective signal to a first reset control terminal;

in a second sub-time period, applying an effective signal to a first scanning signal terminal, a second reset control terminal and a second light emission control signal terminal; and in a third sub-time period, stopping the effective signal applying to the second light emission control signal terminal, and applying an effective signal to a first light emission control signal terminal.

In some embodiments, in the embodiment of the disclosure, an effective signal is applied to the first light emission control signal terminal after the effective signal applying to the second light emission control signal terminal is stopped.

In some embodiments, in the embodiment of the disclosure, in a second time period, controlling the first drive control circuit into conduction with the corresponding second light-emitting device includes:

in the second time period, applying an effective signal to a first light emission control signal terminal and a second light emission control signal terminal.

DETAILED DESCRIPTION OF THE EMBODIMENTS

Figure 1:
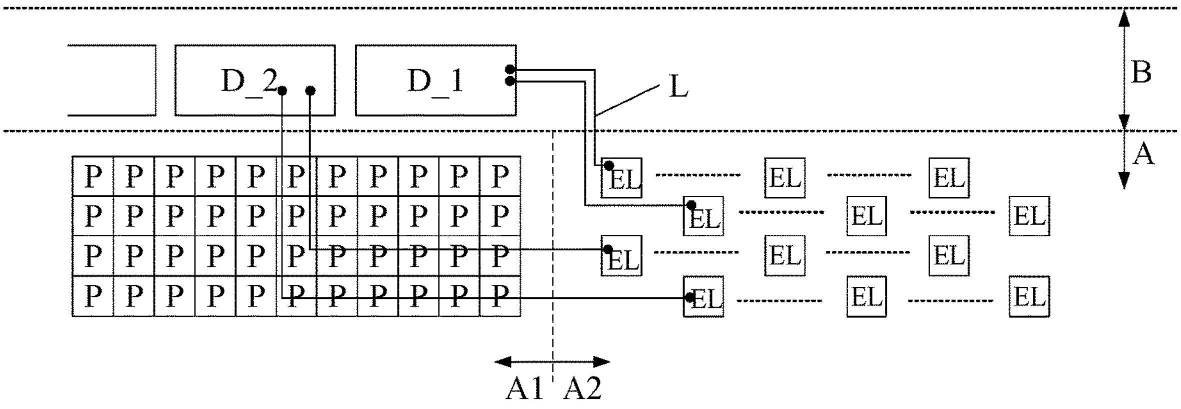
FIG. 1 illustrates a planar structure diagram of a display device with an under-panel-camera in the related art.

FIG. 1 is a planar structure diagram of a display device with an under-panel-camera in the related art. As shown in FIG. 1, the display device includes a display area A and a bezel area B adjacent to the display area A. The display area A includes a first display area A1 and a second display area A2, and a camera may be provided in the second display area A2. A plurality of pixel circuits P are provided in the first display area A1, and each pixel circuit P includes a first light-emitting device and a corresponding driving circuit, i.e., the driving circuit in the pixel circuit P is located in the vicinity of the first light-emitting device. A plurality of second light-emitting devices EL are provided in the second display area A2, and pixel driving circuits (e.g., D_1, and D_2 in FIG. 1) configured to control the second light-emitting devices EL to emit light are located in the bezel area B, and the pixel driving circuits are coupled to the second light-emitting devices EL through first wires L. Due to large loads of the first wires L and different lengths of the first wires L, uneven brightness at low gray scale easily occurs in the second display area A2.

Figure 2:
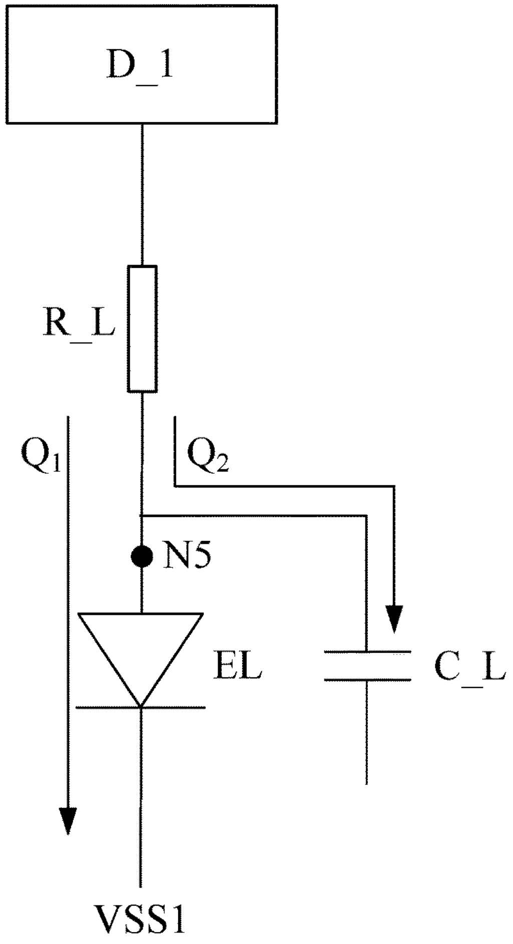
FIG. 2 is a schematic diagram illustrating the light-emitting principle of second light-emitting devices in a second display area.

FIG. 2 is a schematic diagram illustrating the light-emitting principle of the second light-emitting devices in the second display area, and the pixel driving circuit D_1 driving the corresponding second light-emitting device EL is used as an example for illustration in FIG. 2. In FIG. 2, R_L represents the resistance of the first wires L, and C_L represents the parasitic capacitance generated by the first wires L, where the parasitic capacitance is generated by the first wires L and other conductive film layers, and/or the parasitic capacitance is generated between the first wires L. As shown in FIG. 2, the pixel driving circuit D_1 generates a drive current for driving a second light-emitting device EL. When the drive current flows to a second power terminal VSS1, part of charges Q2 will be led to the parasitic capacitor C_L generated by the first wire, resulting in that charges Q1 flowing to the second power terminal VSS1 are reduced and a voltage difference between a fifth node N5 and the second power terminal VSS1 is smaller, such that the brightness of the second light-emitting device EL luminance is reduced. The longer the first wire, the larger the parasitic capacitance C_L generated by the first wire is; the larger the parasitic capacitance C_L generated by the first wire, the fewer charges flow to the second power terminal VSS1 in a frame of time, and the greater the amplitude of reduction in the brightness of the second light-emitting device EL. Therefore, the amplitudes of reduction in the brightness of the second light-emitting devices EL are different due to the different lengths of the first wires, resulting in poor luminance uniformity of the second display area.

Moreover, also referring to FIG. 2, when the second light-emitting device EL is in low gray scale display, the drive current is smaller, the voltage rise of the fifth node N5 is slower, the charging speed of the charges Q2 led to the parasitic capacitor C_L generated by the first wire is slower, thus, most of the charges Q2 are led to the parasitic capacitor C_L, resulting in the amplitude of reduction in the brightness of the second light-emitting device EL in low gray scale display being larger. When the second light-emitting device EL is in high gray scale display, the drive current is larger, the voltage rise of the fifth node N5 is faster, the charging speed of the charges Q2 led to the parasitic capacitor C_L generated by the first wire is faster, thus, fewer charges Q2 are led to the parasitic capacitor C_L, resulting in the amplitude of reduction in the brightness of the second light-emitting device EL in low gray scale display being smaller.

Figure 3:
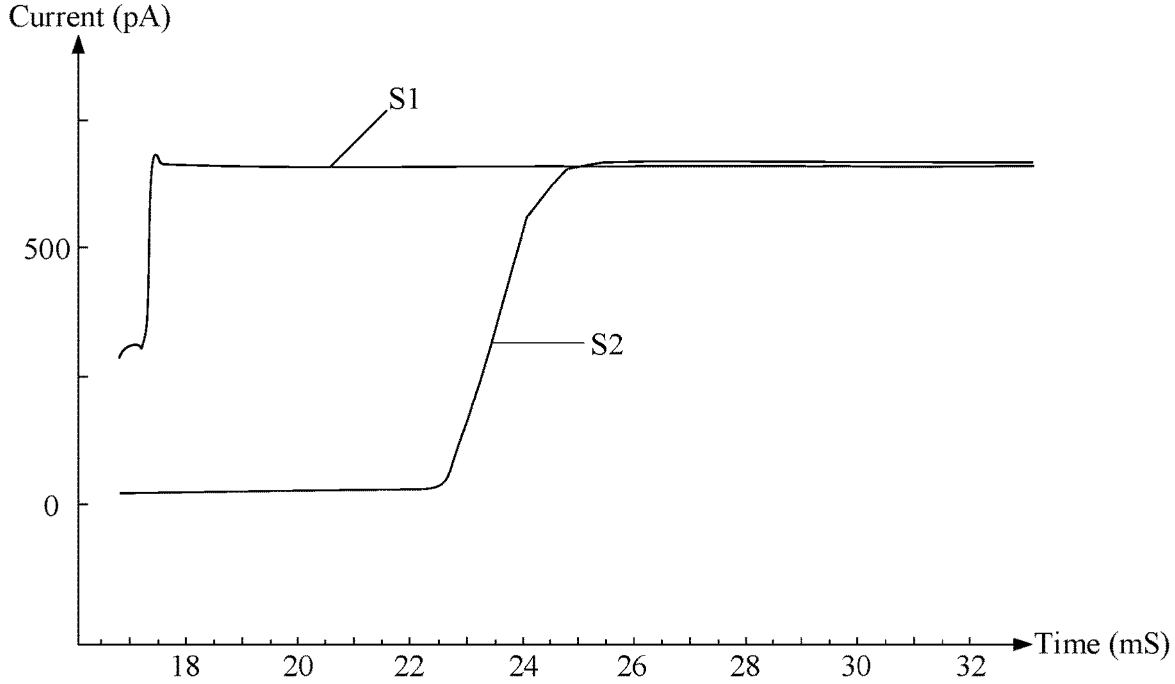
FIG. 3 is a schematic diagram illustrating current curves of the second light-emitting devices in low gray scale display.

FIG. 3 is a schematic diagram of current curves of the second light-emitting devices in low gray scale display. As shown in FIG. 3, a curve S1 represents a current curve of a second light-emitting device corresponding to a shorter first wire, and a curve S2 represents a current curve of a second light-emitting device corresponding to a longer first wire, and upper inflection points in the curve S1 and the curve S2 represent turn-on time of the second light-emitting devices. It can be seen clearly from FIG. 3 that the longer the first wire, the longer the turn-on time of the corresponding second light-emitting device is, and the lower the brightness of the second light-emitting device is.

Based on this, in view of the problem of uneven brightness in a second display area at low gray scale in a display device with an under-panel-camera in the related art, embodiments of the disclosure provide a pixel driving circuit, a driving method thereof, a display substrate, and a display device.

Specific implementations of the pixel driving circuit, the driving method thereof, the display substrate, and the display device provided in the embodiments of the disclosure will be described in detail below in conjunction with the accompanying drawings. The size and shape of each structure in the drawings do not reflect the true scale, and are merely intended to illustrate the disclosure.

Figure 4:
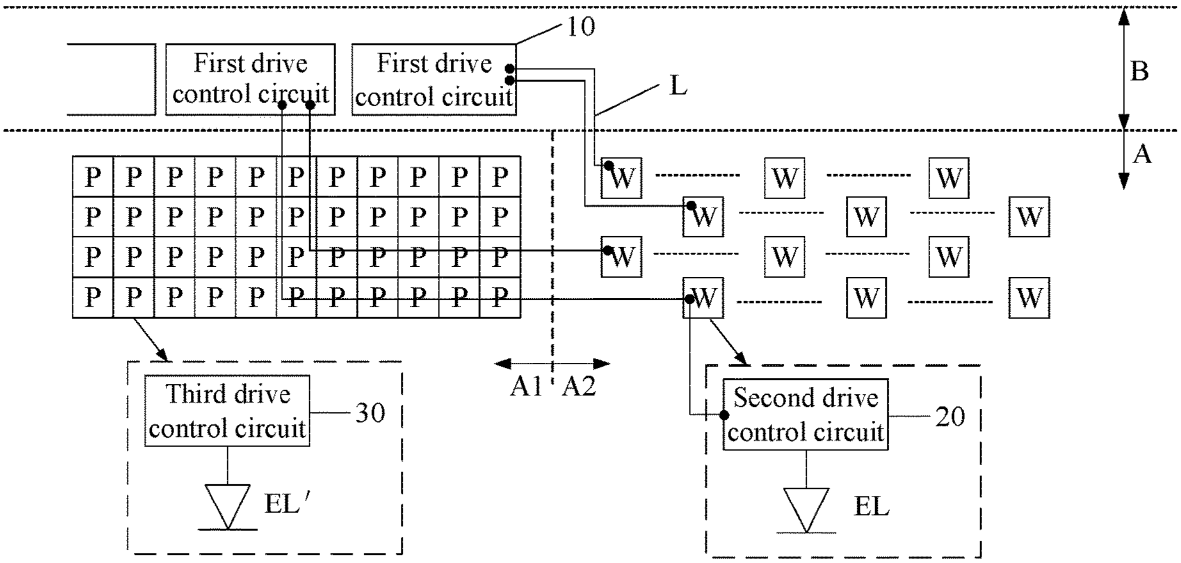
FIG. 4 illustrates a planar structure diagram of a display substrate provided in an embodiment of the disclosure.

An embodiment of the disclosure provides a display substrate. FIG. 4 is a planar structure diagram of a display substrate provided in the embodiment of the disclosure. As shown in FIG. 4, the display substrate includes a display area A and a bezel area B, where the bezel area B may contact an edge of one side of the display area A.

The display area A includes a first display area A1 and a second display area A2; the first display area A1 includes a plurality of first light-emitting devices EL'; in FIG. 4, a plurality of pixel circuits P are provided in the first display area A1, and each pixel circuit P includes a first light-emitting device EL' and a corresponding third drive control circuit 30; and the second display area A2 includes a plurality of second light-emitting devices EL (the plurality of second light-emitting devices are located in respective areas W).

The display substrate includes a plurality of pixel driving circuits correspondingly coupled to the second light-emitting devices EL, respectively.

Figure 5:
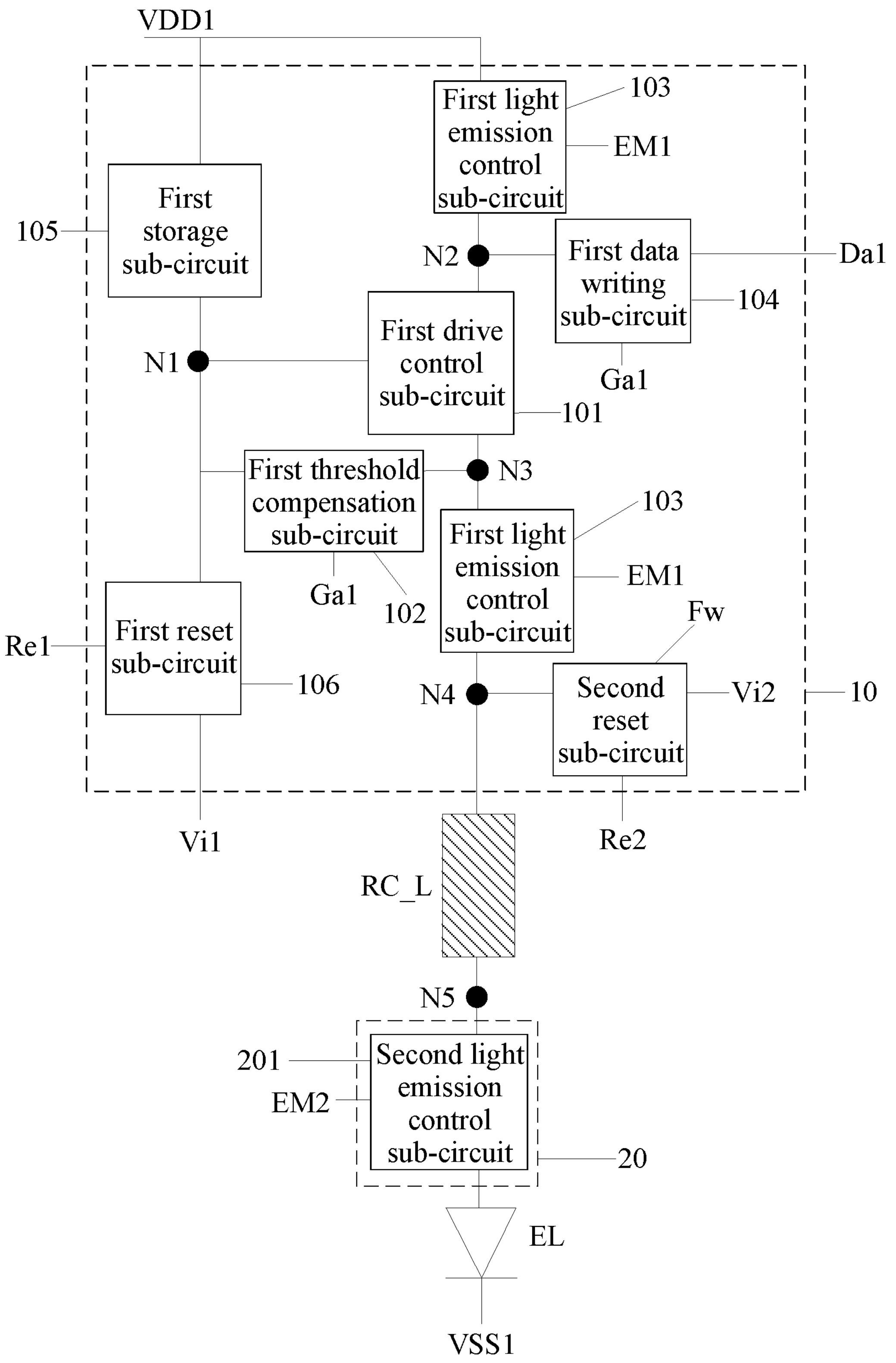
FIG. 5 illustrates a schematic structural diagram of a pixel driving circuit in an embodiment of the disclosure.

FIG. 5 is a schematic structural diagram of a pixel driving circuit in an embodiment of the disclosure. Referring to both FIGS. 4 and 5, the pixel driving circuits includes first drive control circuits 10 located in the bezel area B, and second drive control circuits 20 located in the second display area A2 (in FIG. 4, the second drive control circuits 20 are located in the areas W, that is, the second drive control circuits 20 and the corresponding second light-emitting devices EL are provided in the areas W), the first drive control circuits 10 being coupled to the second drive control circuits 20 through first wires L, and the second drive control circuits 20 being coupled to corresponding second light-emitting devices EL.

Each first drive control circuit 10 is configured to generate a drive current for driving the corresponding second light-emitting device EL.

Each second drive control circuit 20 is configured to make a path between the first drive control circuit 10 and the corresponding second light-emitting device EL conducting after the path is non-conducting for a period of time, when the drive current moves between the second drive control circuit 20 and the first wire L (e.g., to a fifth node N5 in FIG. 5).

In the display substrate provided in the embodiment of the disclosure, by providing the second drive control circuit in the second display area, when the drive current generated by the first drive control circuit moves to the fifth node, the second drive control circuit disconnects the first drive control circuit from the corresponding second light-emitting device for a period of time to charge the parasitic capacitor generated by the first wire to raise the potential of the fifth node, and then the second drive control circuit makes the path between the first drive control circuit and the corresponding second light-emitting device conducting. In this way, currents flowing to the second light-emitting devices can be substantially same, and the brightness uniformity of the second display area is improved.

The display substrate provided in the embodiment of the disclosure may be an organic electroluminescent display substrate, that is, the above-mentioned first light-emitting devices and second light-emitting devices may be organic light-emitting diode devices, and the above-mentioned display substrate may also be other type of display substrate, which is not limited here.

In specific implementation, as shown in FIG. 4, an image collector may be provided in the second display area A2, and on a side of the display substrate away from a light emergent surface. For example, the image collector may be a camera. In an image acquisition time period, light passes through gaps between adjacent second light-emitting devices in the display substrate and impinges on the image collector, and the image collector receives the light that passes through the display substrate, to acquire a corresponding picture. In practical applications, the patterns of a metal film layer, a black matrix and other non-transmissive film layers in the display substrate may be modified and light-transmissive areas are formed in the gaps between adjacent second light-emitting devices to enable light to pass through the display substrate. In addition, a fingerprint recognition sensor may also be used in place of the image collector to achieve an under-panel fingerprint recognition function, or both an image collector and a fingerprint recognition sensor may be provided in the second display area, or other light-sensitive component may be provided in the second display area, which is not limited here.

In some embodiments, in the embodiment of the disclosure, the above-mentioned first wire may be made of a transparent conductive oxide material such as indium tin oxide (ITO), or other transparent conductive material, which is not limited here.

As shown in FIG. 5, RC_L in FIG. 5 represents the resistance and parasitic capacitance of the first wire, and the first drive control circuit 10 is coupled to the second drive control circuit 20 through RC_L; specifically, the first drive control circuit 10 is coupled to RC_L at a fourth node N4, and RC_L is coupled to the second drive control circuit 20 at the fifth node N5; one end of the second light-emitting device EL is coupled to the second drive control circuit 20, and the other end thereof is coupled to a second power terminal VSS1. When the drive current generated by the first drive control circuit 10 moves to the fifth node N5, the second drive control circuit 20 disconnects the first drive control circuit 10 from the corresponding second light-emitting device EL for a period of time so that the drive current charges the parasitic capacitor generated by the first wire to raise the potential of the fifth node N5, and the potential of the fifth node N5 continues to rise, such that the potentials at the nodes N5 in different pixel driving circuits tend to be consistent; and then the second drive control circuit 20 makes the path between the first drive control circuit 10 and the corresponding second light-emitting device EL conducting. Since the parasitic capacitor is charged in advance, the voltage differences between the fifth nodes N5 in different pixel driving circuits and the second power terminal VSS1 are substantially same, such that currents flowing to the second light-emitting devices EL are substantially same, and the brightness uniformity of the second display area is improved.

In some embodiments, in the above-mentioned display substrate provided in the embodiment of the disclosure, as shown in FIG. 5, the first drive control circuit 10 may include:

- a first drive control sub-circuit 101, which is coupled to a first node N1, a second node N2, a third node N3, a first power terminal VDD1 and the second power terminal VSS1, respectively, and configured to generate the drive current for driving the second light-emitting device EL according to signals of the first node N1, the second node N2 and the third node N3;
- a first threshold compensation sub-circuit 102, which is coupled to a first scanning signal terminal Ga1, the first node N1 and the third node N3, respectively, and configured to perform threshold compensation on the first drive control sub-circuit 101 under the control of the first scanning signal terminal Ga1;
- a first light emission control sub-circuit 103, which is coupled to the first power terminal VDD1, a fourth node N4, a first light emission control signal terminal EM1, the second node N2 and the third node N3, respectively, and configured to connect the first power terminal VDD1 and the second node N2 and connect the third node N3 and the fourth node N4 under the control of the first light emission control signal terminal EM1, the fourth node N4 being a node between the first light emission control sub-circuit 103 and the first wire;
- a first data writing sub-circuit 104, which is coupled to the first scanning signal terminal Ga1, a first data signal terminal Da1 and the second node N2, respectively, and configured to provide a data signal of the first data signal terminal Da1 to the second node N2 under the control of the first scanning signal terminal Ga1; and
- a first storage sub-circuit 105, which is coupled to the first power terminal VDD1 and the first node N1, respectively, and configured to store data signals.

In the embodiment of the disclosure, mutual cooperation of the first drive control sub-circuit 101, the first threshold compensation sub-circuit 102, the first light emission control sub-circuit 103, the first data writing sub-circuit 104 and the first storage sub-circuit 105 enables the first drive control circuit 10 to generate the drive current for driving the second light-emitting device EL.

Figure 6:
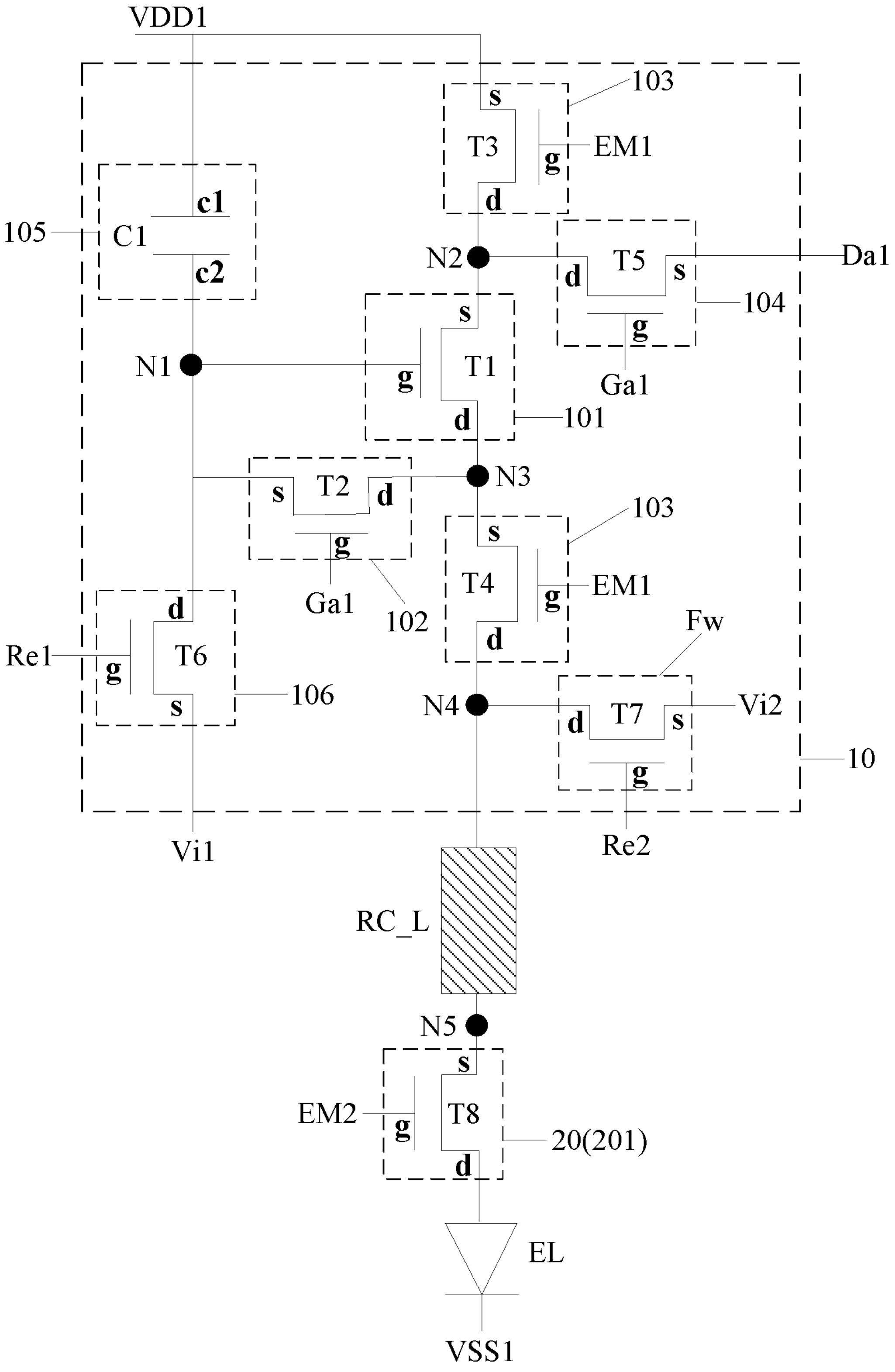
FIG. 6 illustrates a specific structural diagram of a pixel driving circuit corresponding to FIG. 5.

Specifically, in the above-mentioned display substrate provided in the embodiment of the disclosure, FIG. 6 is a specific structural diagram of a pixel driving circuit corresponding to FIG. 5; as shown in FIG. 6, the first drive control sub-circuit 101 may include a first switch transistor T1;

- the first switch transistor T1 has a control terminal g coupled to the first node N1, a first electrode s coupled to the second node N2, and a second electrode d coupled to the third node N3.

Described above is only an example of the specific structure of the first drive control sub-circuit in the display substrate provided in the embodiment of the disclosure. In specific implementation, the specific structure of the first drive control sub-circuit is not limited to the foregoing structure provided in the embodiment of the disclosure, but may also be other structure known to those skilled in the art, which is not limited here.

In specific implementation, in the above-mentioned display substrate provided in the embodiment of the disclosure, as shown in FIG. 6, the first threshold compensation sub-circuit 102 may include a second switch transistor T2;

- the second switch transistor T2 has a control terminal g coupled to the first scanning signal terminal Ga1, a first electrode s coupled to the first node N1, and a second electrode d coupled to the third node N3.

Described above is only an example of the specific structure of the first threshold compensation sub-circuit in the display substrate provided in the embodiment of the disclosure. In specific implementation, the specific structure of the first threshold compensation sub-circuit is not limited to the foregoing structure provided in the embodiment of the disclosure, but may also be other structure known to those skilled in the art, which is not limited here.

In some embodiments, in the above-mentioned display substrate provided in the embodiment of the disclosure, as shown in FIG. 6, the first light emission control sub-circuit 103 may include a third switch transistor T3 and a fourth switch transistor T4;

- the third switch transistor T3 has a control terminal g coupled to the first light emission control signal terminal EM1, a first electrode s coupled to the first power terminal VDD1, and a second electrode d coupled to the second node N2; and
- the fourth switch transistor T4 has a control terminal g coupled to the first light emission control signal terminal EM1, a first electrode s coupled to the third node N3, and a second electrode d coupled to the fourth node N4.

Described above is only an example of the specific structure of the first light emission control sub-circuit in the display substrate provided in the embodiment of the disclosure. In specific implementation, the specific structure of the first light emission control sub-circuit is not limited to the foregoing structure provided in the embodiment of the disclosure, but may also be other structure known to those skilled in the art, which is not limited here.

In practical applications, in the above-mentioned display substrate provided in the embodiment of the disclosure, as shown in FIG. 6, the first data writing sub-circuit 104 includes a fifth switch transistor T5;

the fifth switch transistor T5 has a control terminal g coupled to the first scanning signal terminal Ga1, a first electrode s coupled to the first data signal terminal Da1, and a second electrode d coupled to the second node N2.

Described above is only an example of the specific structure of the first data writing sub-circuit in the display substrate provided in the embodiment of the disclosure. In specific implementation, the specific structure of the first data writing sub-circuit is not limited to the foregoing structure provided in the embodiment of the disclosure, but may also be other structure known to those skilled in the art, which is not limited here.

In some embodiments, in the above-mentioned display substrate provided in the embodiment of the disclosure, as shown in FIG. 6, the first storage sub-circuit 105 may include a first capacitor C1;

the first capacitor C1 has a first electrode c1 coupled to the first power terminal VDD1, and a second electrode c2 coupled to the first node N1.

Described above is only an example of the specific structure of the first storage sub-circuit in the display substrate provided in the embodiment of the disclosure. In specific implementation, the specific structure of the first storage sub-circuit is not limited to the foregoing structure provided in the embodiment of the disclosure, but may also be other structure known to those skilled in the art, which is not limited here.

In specific implementation, in the above-mentioned display substrate provided in the embodiment of the disclosure, as shown in FIG. 5, the first drive control circuit 10 may further include a first reset sub-circuit 106 and a second reset sub-circuit Fw.

The first reset sub-circuit 106 being coupled to the first node N1, the first reset control terminal Re1 and a first reference signal terminal Vi1, respectively, and configured to provide a signal of the first reference signal terminal Vi1 to the first node N1 under the control of the first reset control terminal Re1 to achieve reset of the first drive control sub-circuit 101.

The second reset sub-circuit Fw being coupled to the second light-emitting device EL, a second reset control terminal Re2 and a second reference signal terminal Vi2, respectively, and configured to provide a signal of the second reference signal terminal Vi2 to the second light-emitting device EL under the control of the second reset control terminal Re2 to achieve reset of the second light-emitting device EL.

The second drive control circuit 20 includes:

a second light emission control sub-circuit 201 being coupled to the first light emission control sub-circuit 103, the second light-emitting device EL, and a second light emission control signal terminal EM2, respectively, and configured to make the path between the first light emission control circuit 103 and the second light-emitting device EL conducting under the control of the second light emission control signal terminal EM2. By providing the second light emission control sub-circuit 201, the conducting or no-conducting states between the first light emission control circuit 103 and the second light-emitting device EL can be controlled under the control of the second light emission control signal terminal EM2, so that the parasitic capacitor of the first wire is pre-charged before the drive current flows to the second light-emitting device EL, and the drive current is controlled to flow to the second light-emitting device EL after the parasitic capacitor is charged. In specific implementation, the second light emission control sub-circuit 201 and the corresponding second light-emitting device EL may be provided in an area W as shown in FIG. 4.

In FIG. 5, the second reset sub-circuit Fw is coupled to the fourth node N4, i.e., the second reset sub-circuit Fw is coupled to the second light emission control sub-circuit 201 by the first wire, and thus, in the structure shown in FIG. 5, the second reset sub-circuit Fw is located in the bezel area.

Figure 7:
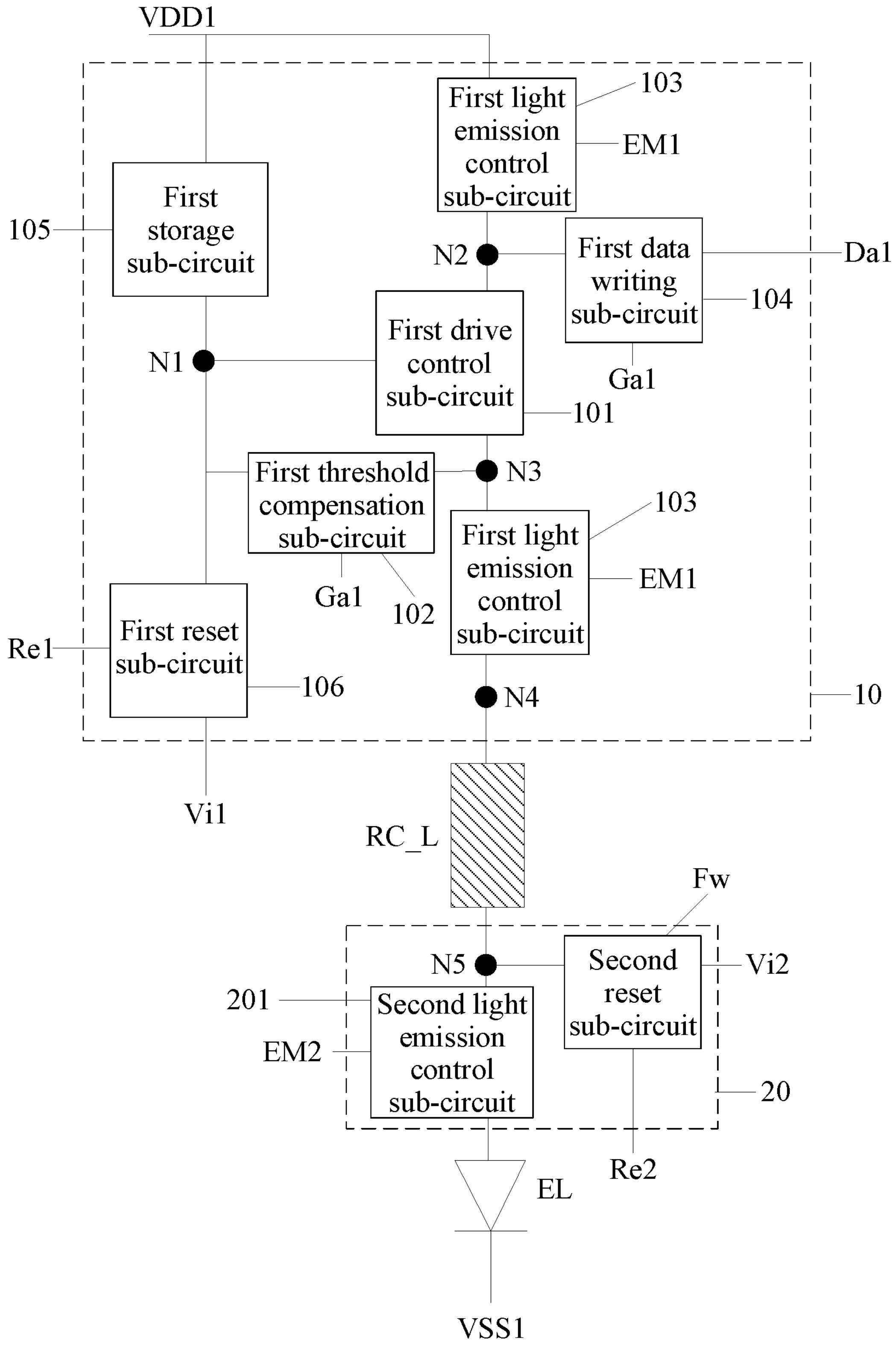
FIG. 7 illustrates another structural diagram of a pixel driving circuit in an embodiment of the disclosure.

FIG. 7 is another structural diagram of a pixel driving circuit in the embodiment of the disclosure. As shown in FIG. 7, in the above-mentioned display substrate provided in the embodiment of the disclosure, the first drive control circuit 10 includes:

the first reset sub-circuit 106 being coupled to the first node N1, the first reset control terminal Re1 and a first reference signal terminal Vi1, respectively, and configured to provide a signal of the first reference signal terminal Vi1 to the first node N1 under the control of the first reset control terminal Re1 to achieve reset of the first drive control sub-circuit 101.

The second drive control circuit 20 includes a second reset sub-circuit Fw and a second light emission control sub-circuit 201.

The second reset sub-circuit Fw being coupled to the second light-emitting device EL, a second reset control terminal Re2 and a second reference signal terminal Vi2, respectively, and configured to provide a signal of the second reference signal terminal Vi2 to the second light-emitting device EL under the control of the second reset control terminal Re2 to achieve reset of the second light-emitting device EL.

The second light emission control sub-circuit 201 is coupled to the first light emission control sub-circuit 103, the second light-emitting device EL, and a second light emission control signal terminal EM2, respectively, and configured to make the path between the first light emission control circuit 103 and the second light-emitting device EL conducting under the control of the second light emission control signal terminal EM2. By providing the second light emission control sub-circuit 201, the conducting or no-conducting states between the first light emission control circuit 103 and the second light-emitting device EL can be controlled under the control of the second light emission control signal terminal EM2, so that the parasitic capacitor of the first wire is pre-charged before the drive current flows to the second light-emitting device EL, and the drive current is controlled to flow to the second light-emitting device EL after the parasitic capacitor is charged.

In FIG. 7, the second reset sub-circuit Fw is coupled to the fifth node N5, i.e., the second reset sub-circuit Fw is coupled to the first light emission control sub-circuit 103 by the first wire, and thus, in the structure shown in FIG. 7, the second reset sub-circuit Fw is located in the second display area. For example, the second reset sub-circuit Fw, the second light emission control sub-circuit 201 and the corresponding second light-emitting device EL may all be provided in an area W shown in FIG. 4.

Figure 8:
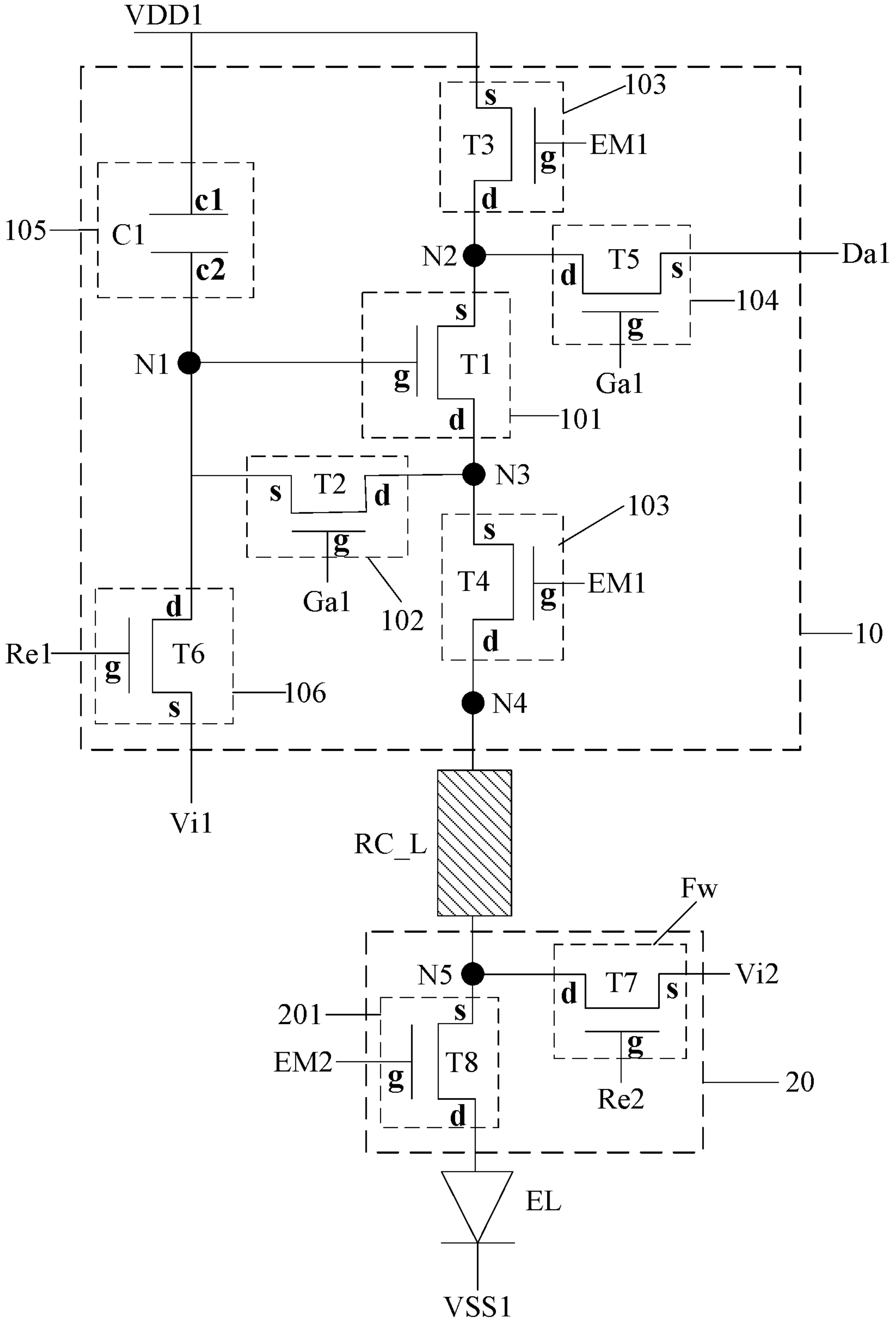
FIG. 8 illustrates a specific structural diagram of a pixel driving circuit corresponding to FIG. 7.

FIG. 8 is a specific structural diagram of a pixel driving circuit corresponding to FIG. 7. As shown in FIGS. 6 and 8, in the above-mentioned display substrate provided in the embodiment of the disclosure, the first reset sub-circuit 106 may include a sixth switch transistor T6;

the sixth switch transistor T6 has a control terminal g coupled to the first reset control terminal Re1, a first electrode s coupled to the first reference signal terminal Vi1, and a second electrode d coupled to the first node N1.

Described above is only an example of the specific structure of the first reset sub-circuit in the display substrate provided in the embodiment of the disclosure. In specific implementation, the specific structure of the first reset sub-circuit is not limited to the foregoing structure provided in the embodiment of the disclosure, but may also be other structure known to those skilled in the art, which is not limited here.

In some embodiments, in the above-mentioned display substrate provided in the embodiment of the disclosure, as shown in FIGS. 6 and 8, the second reset sub-circuit Fw may include a seventh switch transistor T7;

the seventh switch transistor T7 having a control terminal g coupled to the second reset control terminal Re2, a first electrode s coupled to the second reference signal terminal Vi2, and a second electrode d coupled to the second light-emitting device EL.

Described above is only an example of the specific structure of the second reset sub-circuit in the display substrate provided in the embodiment of the disclosure. In specific implementation, the specific structure of the second reset sub-circuit is not limited to the foregoing structure provided in the embodiment of the disclosure, but may also be other structure known to those skilled in the art, which is not limited here.

In specific implementation, in the above-mentioned display substrate provided in the embodiment of the disclosure, as shown in FIGS. 6 and 8, the second light emission control sub-circuit 201 may include an eighth switch transistor T8;

the eighth switch transistor T8 has a control terminal g coupled to the second light emission control signal terminal EM2, a first electrode s coupled to the first light emission control sub-circuit 103, and a second electrode d coupled to the second light-emitting device EL.

Described above is only an example of the specific structure of the second light emission control sub-circuit in the display substrate provided in the embodiment of the disclosure. In specific implementation, the specific structure of the second light emission control sub-circuit is not limited to the foregoing structure provided in the embodiment of the disclosure, but may also be other structure known to those skilled in the art, which is not limited here.

It should be noted that in the embodiment of the disclosure, in the above-mentioned pixel driving circuit, the first reset sub-circuit 106 and the second reset sub-circuit Fw are connected to different reference signal terminals, i.e., the first reset sub-circuit 106 is coupled to the first reference signal terminal Vi1, and the second reset sub-circuit Fw is coupled to the second reference signal terminal Vi2. In specific implementation, the first reset sub-circuit 106 and the second reset sub-circuit Fw may also be coupled to the same reference signal terminal; and similarly, the first reset sub-circuit 106 and the second reset sub-circuit Fw may also be coupled to the same reset control terminal, which is not limited here.

In some embodiments, the above-mentioned display substrate provided in the embodiment of the disclosure, referring to FIG. 4, may further include a plurality of third drive control circuits 30 correspondingly coupled to the first light-emitting devices EL', respectively, the third drive control circuits 30 are located in the first display area A1; for example, the third drive control circuits 30 may be located in the pixel circuits P, i.e., the third drive control circuits 30 are located in the vicinity of the corresponding first light-emitting devices EL'; and each third drive control circuit 30 is configured to generate a drive current for driving the corresponding first light-emitting device EL'.

In the embodiment of the disclosure, by providing the third drive control circuits correspondingly coupled to the first light-emitting devices, respectively, the corresponding first light-emitting device can be driven to emit light to achieve a display effect with relatively good picture quality.

Figure 9:
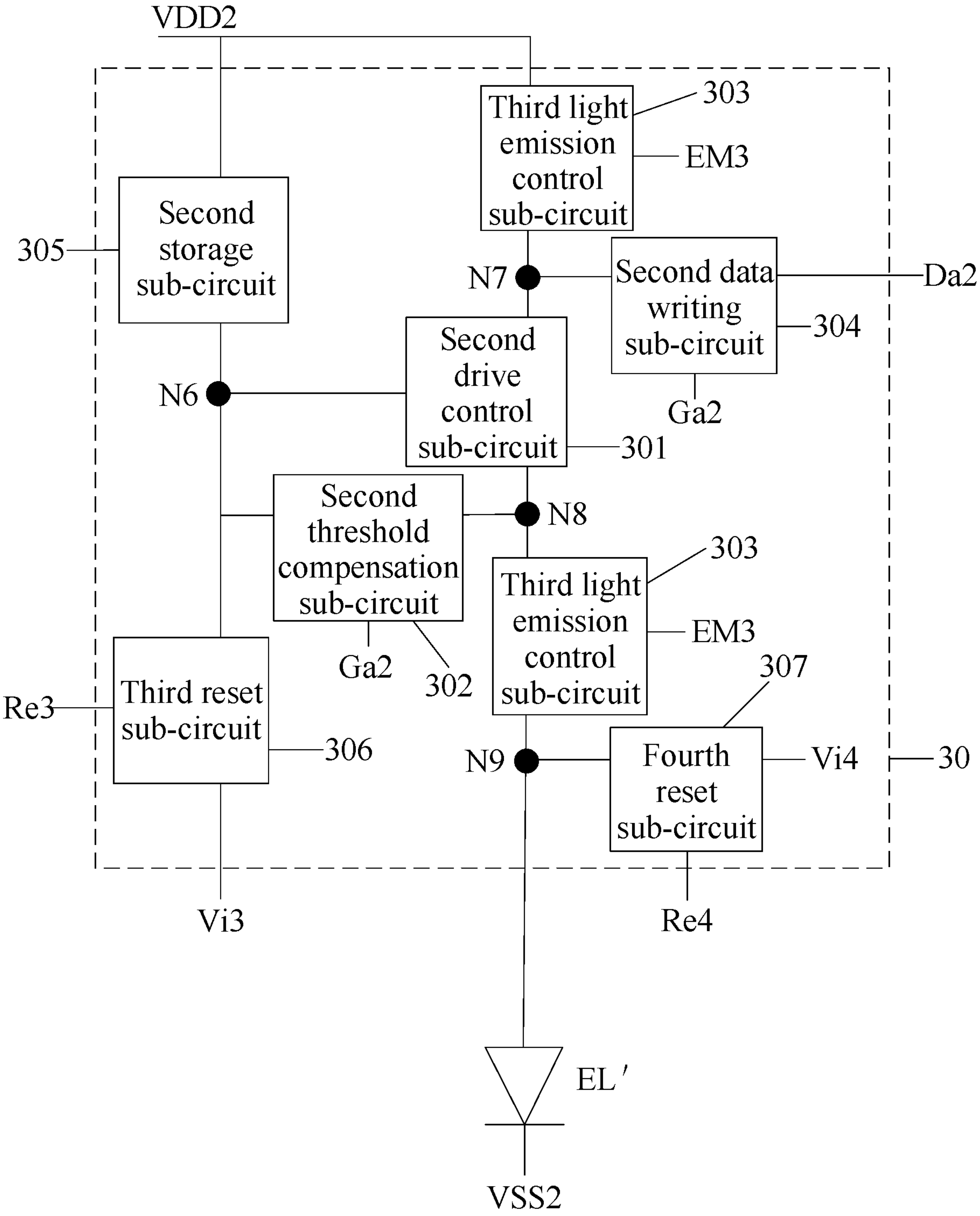
FIG. 9 illustrates a schematic structural diagram of a third drive control circuit in an embodiment of the disclosure.

In specific implementation, in the above-mentioned display substrate provided in the embodiment of the disclosure, FIG. 9 is a schematic structural diagram of a third drive control circuit in the embodiment of the disclosure; as shown in FIG. 9, the third drive control circuit 30 may include:

a second drive control sub-circuit 301, which is coupled to a sixth node N6, a seventh node N7, an eighth node N8, a third power terminal VDD2 and a fourth power terminal VSS2, respectively, and configured to generate a drive current for driving the first light-emitting device EL' according to signals of the sixth node N6, the seventh node N7 and the eighth node N8;

a second threshold compensation sub-circuit 302, which is coupled to a second scanning signal terminal Ga2, the sixth node N6 and the eighth node N8, respectively, and configured to perform threshold compensation on the second drive control sub-circuit 301 under the control of the second scanning signal terminal Ga2;

a third light emission control sub-circuit 303, which is coupled to the third power terminal VDD2, a fourth power terminal VSS2, a third light emission control signal terminal EM3, the seventh node N7 and the eighth node N8, respectively, and configured to couple the third power terminal VDD2 to the seventh node N7, and couple the eighth node N8 to the fourth power terminal VSS2, under the control of the third light emission control signal terminal EM3;

a second data writing sub-circuit 304, which is coupled to the second scanning signal terminal Ga2, a second data signal terminal Da2 and the seventh node N7, respectively, and configured to provide a data signal of the second data signal terminal Da2 to the seventh node N7 under the control of the second scanning signal terminal Ga2;

a second storage sub-circuit 305, which is coupled to the third power terminal VDD2 and the sixth node N6, respectively, and configured to store data signals;

a third reset sub-circuit 306, which is coupled to the sixth node N6, the third reset control terminal Re3 and a third reference signal terminal Vi3, respectively, and configured to provide a signal of the third reference signal terminal Vi3 to the sixth node N6 under the control of the third reset control terminal Re3; and a fourth reset sub-circuit 307, which is coupled to the first light-emitting device EL', a fourth reset control terminal Re4 and a fourth reference signal terminal Vi4, respectively, and configured to provide a signal of the fourth reference signal terminal Vi4 to the first light-emitting device EL' under the control of the fourth reset control terminal Re4, for example, the fourth reset sub-circuit 307 being coupled to the first light-emitting device EL' at a ninth node N9.

In the embodiment of the disclosure, mutual cooperation of the second drive control sub-circuit 301, the second threshold compensation sub-circuit 302, the third light emission control sub-circuit 303, the second data writing sub-circuit 304, the second storage sub-circuit 305, the third reset sub-circuit 306 and the fourth reset sub-circuit 307 enables the first second control circuit 30 to generate the drive current for driving the first light-emitting device EL'.

Figure 10:
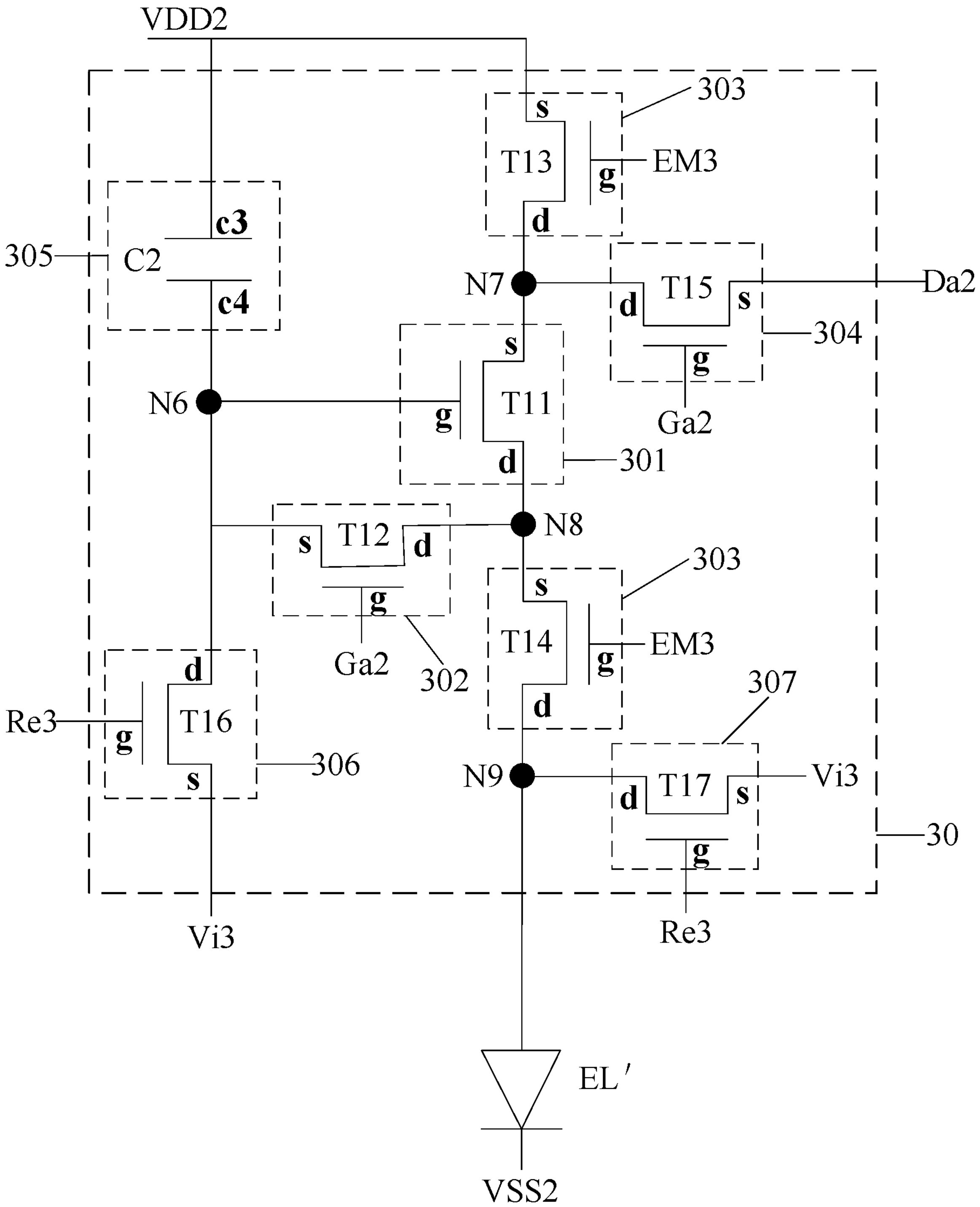
FIG. 10 illustrates a specific structural diagram of a third drive control circuit corresponding to FIG. 9.

Specifically, in the above-mentioned display substrate provided in the embodiment of the disclosure, FIG. 10 is a specific structural diagram of a third drive control circuit corresponding to FIG. 9; as shown in FIG. 10, the second drive control sub-circuit 301 may include an eleventh switch transistor T11;

the eleventh switch transistor T11 has a control terminal g coupled to the sixth node N6, a first electrode s coupled to the seventh node N7, and a second electrode d coupled to the eighth node N8.

The second threshold compensation sub-circuit 302 may include a twelfth switch transistor T12;

the twelfth switch transistor T12 has a control terminal g coupled to the second scanning signal terminal Ga2, a first electrode s coupled to the sixth node N6, and a second electrode d coupled to the eighth node N8.

The third light emission control sub-circuit 303 may include a thirteenth switch transistor T13 and a fourteenth switch transistor T14, the thirteenth switch transistor T13 has a control terminal g coupled to the third light emission control signal terminal EM3, a first electrode s coupled to the third power terminal VDD2, and a second electrode d coupled to the seventh node N7; and the fourteenth switch transistor T14 has a control terminal g coupled to the third light emission control signal terminal EM3, a first electrode s coupled to the eight node N8, and a second electrode d coupled to the fourth power terminal VSS2.

The second data writing sub-circuit 304 may include a fifteenth switch transistor T15;

the fifteenth switch transistor T15 has a control terminal g coupled to the second scanning signal terminal Ga2, a first electrode s coupled to the second data signal terminal Da2, and a second electrode d coupled to the seventh node N7.

The second storage sub-circuit 305 may include a second capacitor C2.

The second capacitor C2 has a first electrode c3 coupled to the third power terminal VDD2, and a second electrode c4 coupled to the sixth node N6.

The third reset sub-circuit 306 is coupled to the sixth node N6, the third reset control terminal Re3 and the third reference signal terminal Vi3, respectively, and configured to provide a signal of the third reference signal terminal Vi3 to the sixth node N6 under the control of the third reset control terminal Re3 to achieve reset of the second drive control sub-circuit 301.

The fourth reset sub-circuit 307 is coupled to the first light-emitting device EL', the fourth reset control terminal Re4 and the fourth reference signal terminal Vi4, respectively, and configured to provide a signal of the fourth reference signal terminal Vi4 to the first light-emitting device EL' under the control of the fourth reset control terminal Re4, to achieve reset of the first light-emitting device EL'.

Described above is only an example of the specific structures of the second drive control sub-circuit, the second threshold compensation sub-circuit, the third light emission control sub-circuit, the second data writing sub-circuit, the second storage sub-circuit, the third reset sub-circuit and the fourth reset sub-circuit in the display substrate provided in the embodiment of the disclosure. In specific implementation, the specific structures of the above-mentioned sub-circuits are not limited to the foregoing structures provided in the embodiment of the disclosure, but may also be other structures known to those skilled in the art, which is not limited here.

It should be noted that in the embodiment of the disclosure, in the above-mentioned third drive control circuit, the third reset sub-circuit 306 and the fourth reset sub-circuit 307 are connected to different reference signal terminals, i.e., the third reset sub-circuit 306 is coupled to the third reference signal terminal Vi3, and the fourth reset sub-circuit 307 is coupled to the fourth reference signal terminal Vi4. In specific implementation, the third reset sub-circuit 306 and the fourth reset sub-circuit 307 may also be coupled to the same reference signal terminal; and similarly, the third reset sub-circuit 306 and the fourth reset sub-circuit 307 may also be coupled to the same reset control terminal, which is not limited here.

Based on the same inventive concept, an embodiment of the disclosure further provides a display device including the above-mentioned display substrate. The display device can be applied to a mobile phone, a tablet computer, a television, a display, a notebook computer, a digital photo frame, a navigator, or any other product or component with a display function. The problem-solving principle of the display device is similar to that of the above-mentioned display substrate, and thus for the implementation of the display device, reference may be made to the implementation of the above-mentioned display substrate, and repeated description is omitted.

In some embodiments, the above-mentioned display device provided in the embodiment of the present invention further includes an image collector.

The image collector is located in the second display area of the display substrate, and the image collector is located on a side of the display substrate away from a light emergent surface.

In specific implementation, the image collector may be a camera. In an image acquisition time period, light passes through gaps between adjacent second light-emitting devices in the display substrate and impinges on the image collector, and the image collector receives the light that passes through the display substrate, to acquire a corresponding picture. In practical applications, the graphics of a metal film layer, a black matrix and other non-transmissive film layers in the display substrate may be improved and light-transmissive areas are formed in the gaps between adjacent second light-emitting devices to enable light to pass through the display substrate. In addition, a fingerprint recognition sensor may also be used in place of the image collector to achieve an under-panel fingerprint recognition function, or both an image collector and a fingerprint recognition sensor may be provided in the second display area, which is not limited here.

Based on the same inventive concept, an embodiment of the present invention further provides a pixel driving circuit. The problem-solving principle of the pixel driving circuit is similar to that of the above-mentioned display substrate, and thus for the implementation of the pixel driving circuit, reference may be made to the implementation of the above-mentioned display substrate, and repeated description is omitted.

The pixel driving circuit provided in the embodiment of the disclosure, as shown in FIG. 5, is configured to drive a second light-emitting device EL. The pixel driving circuit may include:

a first drive control circuit 10, which is configured to generate a drive current for driving the corresponding second light-emitting device EL; and a second drive control circuit 20, which is coupled to the first drive control circuit 10 through a first wire, the second drive control circuit 20 being coupled to the corresponding second light-emitting device EL; and configured to make the path between the first drive control circuit 10 and the corresponding second light-emitting device 20 conducting after the path is non-conducting for a period of time, when the drive current moves between the second drive control circuit 20 and the first wire.

In the embodiment of the disclosure, by providing the second drive control circuit, when the drive current generated by the first drive control circuit moves to the fifth node, the second drive control circuit disconnects the first drive control circuit from the corresponding second light-emitting device for a period of time to charge the parasitic capacitor generated by the first wire to raise the potential of the fifth node, and then the second drive control circuit makes the path between the first drive control circuit and the corresponding second light-emitting device conducting. In this way, currents flowing to the second light-emitting devices can be substantially same, and the brightness uniformity of the second display area is improved.

Based on the same inventive concept, an embodiment of the present invention further provides a driving method of the above-mentioned pixel driving circuit. The problem-solving principle of the driving method is similar to that of the above-mentioned pixel driving circuit, and thus for the implementation of the driving method, reference may be made to the implementation of the above-mentioned pixel driving circuit, and repeated description is omitted.

Figure 11:
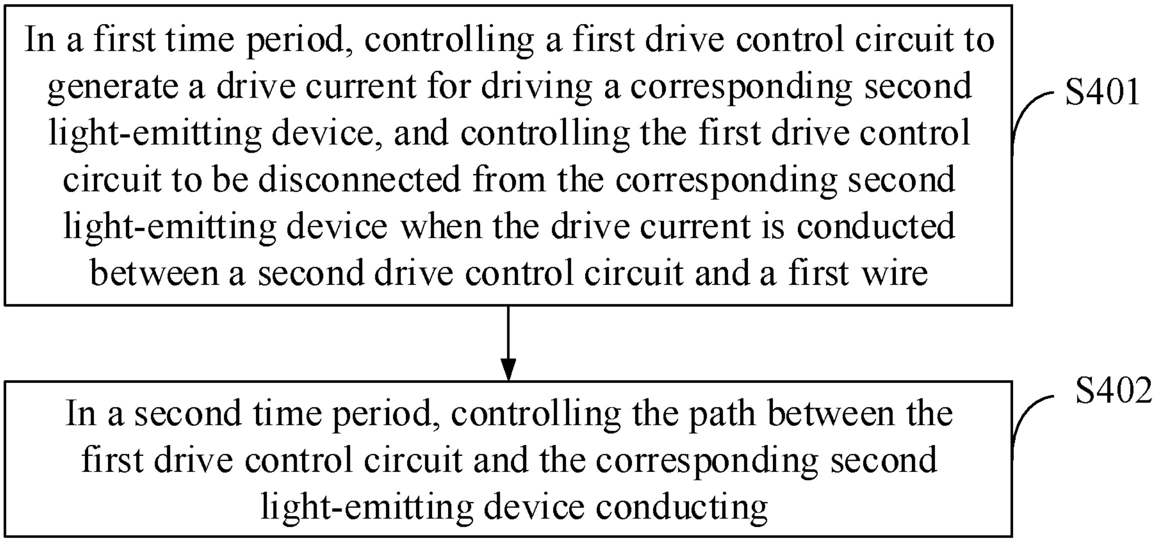
FIG. 11 illustrates a flow diagram of the above-mentioned pixel driving circuit provided in an embodiment of the disclosure.

The driving method of the above-mentioned pixel driving circuit provided in the embodiment of the disclosure, as shown in FIG. 11, includes:

S401, in a first time period, controlling a first drive control circuit to generate a drive current for driving a corresponding second light-emitting device, and controlling the first drive control circuit to be disconnected from the corresponding second light-emitting device when the drive current moves between a second drive control circuit and a first wire; and S402, in a second time period, controlling the path between the first drive control circuit and the corresponding second light-emitting device be in a conduction state.

In the driving method provided in the embodiment of the disclosure, in the first time period, when the drive current generated moves between the second drive control circuit and the first wire (i.e., to the fifth node), the first drive control circuit is controlled to be disconnected from the corresponding second light-emitting device to charge the parasitic capacitor generated by the first wire to raise the potential of the fifth node, and in the second time period, the path between the first drive control circuit and the corresponding second light-emitting device is in conduction state. In this way, currents flowing to the second light-emitting devices can be substantially same, and the brightness uniformity of the second display area is improved.

The above-mentioned driving method provided in the embodiment of the disclosure is described in detail below by using the pixel driving circuit shown in FIGS. 5 to 8 as an example, in conjunction with a circuit timing diagram shown in FIG. 12.

In specific implementation, in the above-mentioned driving method provided in the embodiment of the disclosure, the above-mentioned step S401 may include:

in a first sub-time period t1, applying an effective signal to a first reset control terminal Re1, to provide a signal of a first reference signal terminal Vi1 to a first node N1 to achieve reset of the first drive control sub-circuit 101;

in a second sub-time period t2, applying effective signals to a first scanning signal terminal Ga1, a second reset control terminal Re and a second light emission control signal terminal EM2, wherein when the effective signal is applied to the first scanning signal terminal Ga1, the first threshold compensation sub-circuit 102 performs threshold compensation on the first drive control sub-circuit 101 and a data signal of the first data signal terminal Da1 is provided to a second node N2, under the control of the first scanning signal terminal Ga1; and when the effective signals are applied to the second reset control terminal Re2 and the second light emission control signal terminal EM2, a fourth node N4 (or a fifth node N5) connects the second light-emitting device EL under the control of the second light emission control signal terminal EM2, and a signal of the second reference signal terminal Vi2 is provided to the second light-emitting device EL under the control of the second reset control terminal Re2 to achieve reset of the second light-emitting device EL; and in a third sub-time period t3, stopping the effective signal applying to the second light emission control signal terminal EM2, and applying an effective signal to a first light emission control signal terminal EM1, so that the first light emission control circuit 103 is disconnected from the second light-emitting device EL to charge the parasitic capacitor generated by the first wire to raise the potential of the fifth node N5.

Further, in the above-mentioned step S401, the first light emission control signal terminal EM1 is applied with an effective signal after the applying of an effective signal to the second light emission control signal terminal EM2 is stopped; in this way, leakage can be avoided in the process of charging the parasitic capacitor generated by the first wire; otherwise, in a short period of time after starting to apply the effective signal to the first light emission control signal terminal EM1, a current can flow through the like second light-emitting device EL and cause light emission, and especially in high gray scale display, a flash can be obviously seen in the second light-emitting device EL in the first time period due to a large drive current. Specifically, it is possible that in the second sub-time period t2, after an effective signal is applied to the second light emission control signal terminal EM2 for a period of time, the applying of the effective signal to the second light emission control signal terminal EM2 is stopped, and then an effective signal is applied to the first light emission control signal terminal EM1 in the third sub-time period t3; or it is also possible that in the third sub-time period t3, the applying of the effective signal to the second light emission control signal terminal EM2 is stopped, and then an effective signal is applied to the first light emission control signal terminal EM1.

In specific implementation, in the above-mentioned driving method provided in the embodiment of the disclosure, the above-mentioned step S402 may include:

in the second time period t4, applying effective signals to a first light emission control signal terminal EM1 and a second light emission control signal terminal EM2, thereby controlling the first drive control circuit connect with the corresponding second light-emitting device to cause the second light-emitting device to emit light.

A working process of the display substrate provided in the embodiment of the disclosure is described below by using the pixel driving circuit shown in FIGS. 6 to 8 as an example, in conjunction with the circuit timing diagram shown in FIG. 12. The switch transistors in FIG. 6 to FIG. 8 being P-type transistors, i.e., a low level being an effective signal are used as an example for illustration.

Figure 12:
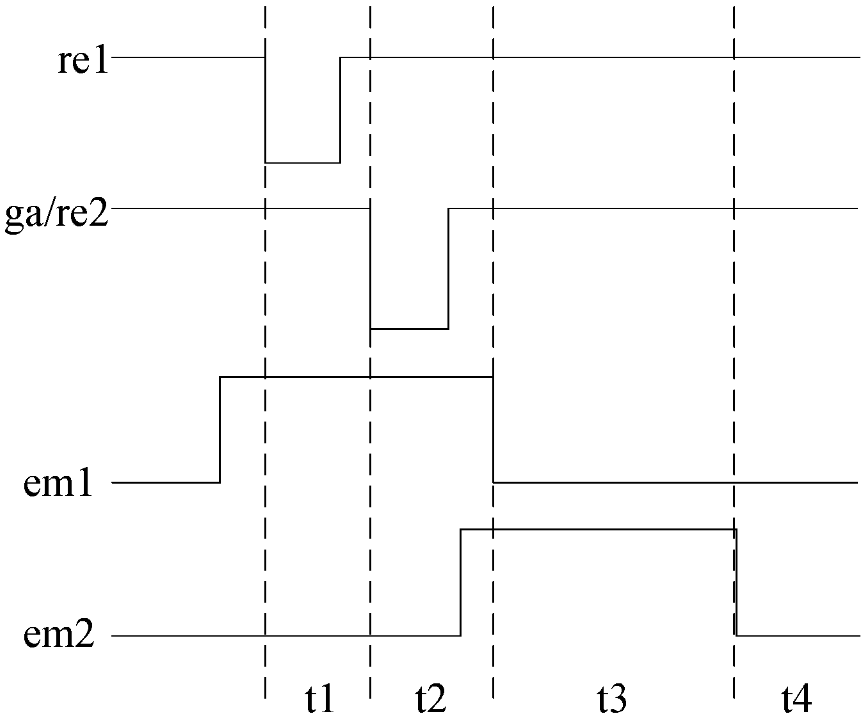
FIG. 12 illustrates a circuit timing diagram of a pixel driving circuit in an embodiment of the disclosure.

In FIG. 12, re1 represents a signal applied to the first reset control terminal Re1, re2 represents a signal applied to the second reset control terminal Re2, ga represents a signal applied to the first scanning signal terminal Ga1, em1 represents a signal applied to the first light emission control signal terminal EM1, and em2 represents a signal applied to the second light emission control signal terminal EM2.

In the first sub-time period t1, the signal re1 applied to the first reset control terminal Re1 is at a low level, causing the sixth switch transistor T6 to be turned on, and the signal of the first reference signal terminal Vi1 is provided to the first node N1 to reset the control terminal of the first switch transistor T1.

In the second sub-time period t2, the signal ga applied to the first scanning signal terminal Ga1 is at a low level, causing the second switch transistor T2 and the fifth switch transistor T5 to be turned on; as the fifth switch transistor T5 is turned on, the data signal of the first data signal terminal Da1 is provided to the second node N2, and as the second switch transistor T2 is turned on, the first node N1 connects the third node N3, causing the first switch transistor T1 to be turned on, such that the data signal is led to the first node N1; and the signal re2 applied to the second reset control terminal Re2 is at a low level, causing the seventh switch transistor T7 to be turned on, and the signal of the second reference signal terminal Vi2 is provided to the fourth node N4 and the fifth node N5 to reset the fourth node N4 and the fifth node N5; and at the same time, the signal em2 applied to the second light emission control signal terminal signal EM2 is also at a low level, causing the eighth switch transistor T8 to be turned on, and the signal of the second reference signal terminal Vi2 is provided to the second light-emitting device EL to achieve reset of the second light-emitting device EL.

In the third sub-time period t3, the signal em1 applied to the first light emission control signal terminal EM1 is at a low level, causing the third light-emitting transistor T3 and the fourth switch transistor T4 to be turned on to connect the first power terminal VDD1 and the second node N2 and connect the third node N3 and the fourth node N4, and the third switch transistor T3 causes the voltage of the first power terminal VDD1 to be supplied to the first electrode s of the first switch transistor T1, such that the first switch transistor T1 generates a drive current; and the signal em2 applied to the second light emission control signal terminal EM2 is at a high level, causing the eighth switch transistor T8 to be turned off, such that the drive current is continuously led to the parasitic capacitor generated by the first wire, and the voltages of the fourth node point N4 and the fifth node point N5 keep rising, and after the parasitic capacitor is fully charged, the voltage of the fourth node point N4 (or the fifth node N5) in each pixel driving circuit tends to the same.

In addition, to avoid leakage in the process of charging the parasitic capacitor generated by the first wire, it is possible that in the second sub-time period t2, after a low-level signal is applied to the second light emission control signal terminal EM2 for a period of time, a high-level signal is applied to the second light emission control signal terminal EM2, and a low-level signal is applied to the first light emission control signal terminal EM1 in the third sub-time period t3; or it is also possible that in the third sub-time period t3, a high-level signal is applied to the second light emission control signal terminal EM2, and then a low-level signal is applied to the first light emission control signal terminal EM1.

In the fourth sub-time period t4, the signal em1 applied to the first light emission control signal terminal EM1 is at a low level, and the signal applied em2 to the second light emission control signal terminal EM2 is at a low level, such that the drive current flows to the second light-emitting device EM to cause the second light-emitting device EM to emit light. Due to the pre-charging of the parasitic capacitor generated by the first wire in the third sub-time period t3, the voltage difference between the fourth node N4 (or the fifth node N5) and the second power terminal VSS1 is large, resulting in a large average current in a frame of time, thus avoiding the phenomenon of delayed turn-on of the second light-emitting device EL and improving the phenomenon of uneven display of a low gray-scale picture in the second display area.

In specific implementation, other methods of compensating for the parasitic capacitance of the first wire may also be used to further eliminate the influence of the resistance and parasitic capacitance of the first wire on the display effect.

In addition, by adopting the display substrate, the driving method thereof and the display device provided in the embodiments of the disclosure, the high gray-scale display effect of the second display area is not influenced while improving the uneven brightness of the second display area in low gray-scale display. Two comparative examples are used below for comparative analysis.

Comparative example I: Due to higher luminous efficiency of a green pixel, the green pixel has the smallest current at the same gray scale, and thus, the display effect of the green pixel reflects a low gray-scale display effect. Table 1 indicates the correspondence relationship between the duration of the third sub-time period, the load of the first wire and the current of the second light-emitting device. As shown in Table 1, "G=5.1V" in Table 1 indicates that the voltage difference between the first power terminal and the second power terminal is 5.1V; the maximum resistance of the first wire in Table 1 is 896 kΩ, that is, 100% corresponds to the resistance of 896 kΩ; and the maximum value of the parasitic capacitance of the first wire is 3.6 pF. It can be seen obviously from Table 1 that as the duration of the third sub-time period t3 varies between 200 μs and 2 ms, for different first resistance of the wire, the difference in the current of the second light-emitting device does not exceed 2%, which is within a debugging range of a gamma voltage; and when the duration of the third sub-time period t3 is 0, the current difference of the second light-emitting device is obvious, which is embodied as low luminance uniformity of the second display area in low gray-scale display. Therefore, for the second display area in low gray-scale display, the luminance unevenness of the second display area caused by the first wire can be improved by adjusting the third sub-time period t3, and on the basis of improving the luminance uniformity of the second display area, the duration of the third sub-time period t3 is minimized to avoid influencing the luminous effect of the fourth sub-time period t4.

TABLE 1

| G = 5.1 V, current of the second light-emitting device/pA | | Resistance of the first wire 100% | 60% | 20% |
|---|---|---|---|---|
| Duration of t3 | 2 ms | 200.09 | 199.91 | 200.09 |
| | 1 ms | 199.8 | 200.2 | 201.15 |
| | 500 us | 202.99 | 203 | 202.2 |
| | 200 us | 203.52 | 200.76 | 202.58 |
| | 0 ms | 3.7378 | 6.1099 | 102.03 |

Comparative example II: Due to lower luminous efficiency of a blue pixel, the blue pixel has a larger current at the same gray scale, and thus, the display effect of the blue pixel reflects a high gray-scale display effect. Table 2 indicates the correspondence relationship between the duration of the third sub-time period, the load of the first wire and the current of the second light-emitting device. As shown in Table 2, "B=2.8V" in Table 2 indicates that the voltage difference between the first power terminal and the second power terminal is 2.8V; the maximum resistance of the first wire in Table 2 is 896 kΩ, that is, 100% corresponds to the resistance of 896 kΩ; and the maximum value of the parasitic capacitance of the first wire is 3.6 pF. It can be seen obviously from Table 2 that as the duration of the third sub-time period t3 varies between 0 and 2 ms, for different first resistance of the wire, the difference in the current of the second light-emitting device does not exceed 2%, which is within a debugging range of a gamma voltage, and although the second light-emitting device has different currents for different durations of the third sub-time period t3, the current uniformity of the second light-emitting device is better when the duration of the third sub-time period t3 is fixed. Therefore, the third sub-time period t3 does not influence the high gray-scale display effect of the second display area.

TABLE 2

| B = 2.8 V, current of the second light-emitting device/nA | | Resistance of the first wire 100% | 60% | 20% |
|---|---|---|---|---|
| Duration of t3 | 2 ms | 80.959 | 81.775 | 82.158 |
| | 1 ms | 86.437 | 87.349 | 87.781 |
| | 500 us | 89.204 | 90.137 | 90.563 |
| | 200 us | 90.654 | 91.778 | 92.262 |
| | 0 ms | 92.279 | 92.606 | 92.699 |

In the pixel driving circuit, the driving method thereof, the display substrate and the display device provided in the embodiment of the disclosure, by providing the second drive control circuit in the second display area, when the drive current generated by the first drive control circuit moves to the fifth node, the second drive control circuit disconnects the first drive control circuit from the corresponding second light-emitting device for a period of time to charge the parasitic capacitor generated by the first wire to raise the potential of the fifth node, and then the second drive control circuit makes the path between the first drive control circuit and the corresponding second light-emitting device conducting. In this way, currents flowing to the second light-emitting devices can be substantially same, and the brightness uniformity of the second display area is improved.

The preferred embodiments of the disclosure are described above; however, once those skilled in the art get the basic inventive concepts, they can make additional variations and modifications to these embodiments. Therefore, the appended claims are intended to be interpreted as including the preferred embodiments and all variations and modifications falling into the scope of the disclosure.

Evidently those skilled in the art can make various modifications and variations to the embodiments of the disclosure without departing from the spirit and scope of the embodiments of the disclosure.

Thus, the disclosure is also intended to encompass these modifications and variations to the embodiments of the disclosure so long as the modifications and variations come into the scope of the claims appended to the disclosure and their equivalents.

What is claimed is:

1. A display substrate, wherein the display substrate has a display area and a bezel area, wherein the display area comprises a first display area and a second display area; the display substrate comprises:

a plurality of first light-emitting devices in the first display area;

a plurality of second light-emitting devices in the second display area; and a plurality of pixel driving circuits correspondingly coupled to the plurality of second light-emitting devices, respectively;

wherein the pixel driving circuits each is coupled to a first power terminal and a second power terminal and comprises a first drive control circuit in the bezel area, and a second drive control circuit in the second display area, the first drive control circuit being coupled to the second drive control circuit through a first wire, and the second drive control circuit being coupled to a corresponding one of the plurality of second light-emitting devices;

wherein each first drive control circuit is configured to generate a drive current for driving a corresponding one of the plurality of second light-emitting devices;

each second drive control circuit is configured, when the drive current moves between the second drive control circuit and the first wire, to make a path between the first drive control circuit and the corresponding one of the plurality of second light-emitting devices non-conducting for a period of time, and then to make the path conducting; and the first drive control circuit comprises:

a first drive control sub-circuit;

a first threshold compensation sub-circuit;

a first light emission control sub-circuit;

a first data writing sub-circuit; and a first storage sub-circuit;

wherein a node connecting the first drive control sub-circuit and the first storage sub-circuit is a first node, a node connecting the first drive control sub-circuit and the first data writing sub-circuit is a second node, a node connecting the first drive control sub-circuit and a first threshold compensation sub-circuit is a third node;

wherein the first drive control sub-circuit, which is coupled to the first node, the second node, the third node, the first power terminal and the second power terminal, respectively, and configured to generate the drive current for driving the corresponding one of the plurality of second light-emitting devices according to signals of the first node, the second node and the third node;

the first threshold compensation sub-circuit, which is coupled to a first scanning signal terminal, the first node and the third node, respectively, and configured to perform threshold compensation on the first drive control sub-circuit under control of the first scanning signal terminal;

the first light emission control sub-circuit, which is coupled to the first power terminal, a first light emission control signal terminal, the second node and the third node, respectively, and configured to connect the first power terminal and the second node and connect the third node and the fourth node under control of the first light emission control signal terminal;

the first data writing sub-circuit, which is coupled to the first scanning signal terminal, a first data signal terminal and the second node, respectively, and configured to provide a data signal of the first data signal terminal to the second node under control of the first scanning signal terminal; and the first storage sub-circuit, which is coupled to the first power terminal and the first node, respectively, and configured to store data signals.

2. The display substrate of claim 1, wherein the first drive control sub-circuit comprises a first switch transistor; wherein the first switch transistor has a control terminal coupled to the first node, a first electrode coupled to the second node, and a second electrode coupled to the third node.

3. The display substrate of claim 1, wherein the first threshold compensation sub-circuit comprises a second switch transistor;

wherein the second switch transistor has a control terminal coupled to the first scanning signal terminal, a first electrode coupled to the first node, and a second electrode coupled to the third node.

4. The display substrate of claim 1, wherein the first light emission control sub-circuit comprises a third switch transistor and a fourth switch transistor;

wherein the third switch transistor has a control terminal coupled to the first light emission control signal terminal, a first electrode coupled to the first power terminal, and a second electrode coupled to the second node; and the fourth switch transistor has a control terminal coupled to the first light emission control signal terminal, a first electrode coupled to the third node, and a second electrode connected to the second drive control circuit.

5. The display substrate of claim 1, wherein the first data writing sub-circuit comprises a fifth switch transistor; wherein the fifth switch transistor has a control terminal coupled to the first scanning signal terminal, a first electrode coupled to the first data signal terminal, and a second electrode coupled to the second node.

6. The display substrate of claim 1, wherein the first storage sub-circuit comprises a first capacitor;

wherein the first capacitor has a first electrode coupled to the first power terminal, and a second electrode coupled to the first node.

7. The display substrate of claim 1, wherein the first drive control circuit further comprises a first reset sub-circuit and a second reset sub-circuit;

wherein the first reset sub-circuit is coupled to the first node, the first reset control terminal and a first reference signal terminal, respectively, and configured to provide a signal of the first reference signal terminal to the first node under control of the first reset control terminal, and the second reset sub-circuit is coupled to the second light-emitting device, a second reset control terminal and a second reference signal terminal, respectively, and configured to provide a signal of the second reference signal terminal to the second light-emitting device under control of the second reset control terminal;

wherein the second drive control circuit comprises:

a second light emission control sub-circuit, which is coupled to the first light emission control sub-circuit, the second light-emitting device and a second light emission control signal terminal, respectively, and configured to make a path between the first light emission control circuit and the second light-emitting device conducting under control of the second light emission control signal terminal.

8. The display substrate of claim 7, wherein the first reset sub-circuit comprises a sixth switch transistor;

wherein the sixth switch transistor has a control terminal coupled to the first reset control terminal, a first electrode coupled to the first reference signal terminal, and a second electrode coupled to the first node.

9. The display substrate of claim 7, wherein the second reset sub-circuit comprises a seventh switch transistor;

wherein the seventh switch transistor has a control terminal coupled to the second reset control terminal, a first electrode coupled to the second reference signal terminal, and a second electrode coupled to the second light-emitting device.

10. The display substrate of claim 7, wherein the second light emission control sub-circuit comprises an eighth switch transistor;

wherein the eighth switch transistor has a control terminal coupled to the second light emission control signal terminal, a first electrode coupled to the first light emission control sub-circuit, and a second electrode coupled to the second light-emitting device.

11. The display substrate of claim 1, wherein the first drive control circuit comprises:

a first reset sub-circuit, which is coupled to the first node, a first reset control terminal and a first reference signal terminal, respectively, and configured to provide a signal of the first reference signal terminal to the first node under control of the first reset control terminal; and the second drive control circuit comprises a second reset sub-circuit and a second light emission control sub-circuit;

wherein the second reset sub-circuit is coupled to the second light-emitting device, a second reset control terminal and a second reference signal terminal, respectively, and configured to provide a signal of the second reference signal terminal to the second light-emitting device under control of the second reset control terminal; and the second light emission control sub-circuit is coupled to the first light emission control sub-circuit, the second light-emitting device and a second light emission control signal terminal, respectively, and configured to make a path between the first light emission control circuit and the second light-emitting device conducting under the control of the second light emission control signal terminal.

12. The display substrate of claim 1, further comprising a plurality of third drive control circuits correspondingly coupled to the plurality of first light-emitting devices respectively, wherein the plurality of third drive control circuits are located in the first display area; and each third drive control circuit is configured to generate a drive current for driving a corresponding one of the plurality of first light-emitting devices.

13. The display substrate of claim 12, wherein the third drive control circuit comprises:

a second drive control sub-circuit;

a second threshold compensation sub-circuit;

a third light emission control sub-circuit;

a second data writing sub-circuit;

a second storage sub-circuit;

a third reset sub-circuit; and a fourth reset sub-circuit;

wherein a node connecting the second drive control sub-circuit and the second storage sub-circuit is a sixth node, a node connecting the second drive control sub-circuit and the second data writing sub-circuit is a seventh node, and a node connecting the second drive control sub-circuit and the second threshold compensation sub-circuit is an eighth node;

wherein the second drive control sub-circuit, which is coupled to the sixth node, the seventh node, the eighth node, a third power terminal and a fourth power terminal, respectively, and configured to generate a drive current for driving the first light-emitting device according to signals of the sixth node, the seventh node and the eighth node;

the second threshold compensation sub-circuit, which is coupled to a second scanning signal terminal, the sixth node and the eighth node, respectively, and configured to perform threshold compensation on the second drive control sub-circuit under control of the second scanning signal terminal;

the third light emission control sub-circuit, which is coupled to the third power terminal, a fourth power terminal, a third light emission control signal terminal, the seventh node and the eighth node, respectively, and configured to couple the third power terminal to the seventh node, and couple the eighth node to the fourth power terminal, under control of the third light emission control signal terminal;

the second data writing sub-circuit, which is coupled to the second scanning signal terminal, a second data signal terminal and the seventh node, respectively, and configured to provide a data signal of the second data signal terminal to the seventh node under control of the second scanning signal terminal;

the second storage sub-circuit, which is coupled to the third power terminal and the sixth node, respectively, and configured to store data signals;

the third reset sub-circuit, which is coupled to the sixth node, the third reset control terminal and a third reference signal terminal, respectively, and configured to provide a signal of the third reference signal terminal to the sixth node under control of the third reset control terminal; and the fourth reset sub-circuit, which is coupled to the first light-emitting device, a fourth reset control terminal and a fourth reference signal terminal, respectively, and configured to provide a signal of the fourth reference signal terminal to the first light-emitting device under control of the fourth reset control terminal.

14. A display device, comprising the display substrate of claim 1.

15. The display device of claim 14, further comprising an image collector, wherein the image collector is located in the second display area, and is disposed on a side of the display substrate away from a light emergent surface.

16. A pixel driving circuit, which is coupled to a first power terminal and a second power terminal and configured to drive a second light-emitting device, the pixel driving circuit comprising:

a first drive control circuit, which is configured to generate a drive current for driving a corresponding second light-emitting device; and a second drive control circuit, which is coupled to the first drive control circuit through a first wire, and coupled to the corresponding second light-emitting device; and configured, when the drive current moves between the second drive control circuit and the first wire, to make a path between the first drive control circuit and the corresponding second light-emitting device non-conducting for a period of time, and then to make the path conducting;

wherein the first drive control circuit comprises:

a first drive control sub-circuit;

a first threshold compensation sub-circuit;

a first light emission control sub-circuit;

a first data writing sub-circuit; and a first storage sub-circuit;

wherein a node connecting the first drive control sub-circuit and the first storage sub-circuit is a first node, a node connecting the first drive control sub-circuit and the first data writing sub-circuit is a second node, a node connecting the first drive control sub-circuit and a first threshold compensation sub-circuit is a third node;

wherein the first drive control sub-circuit, which is coupled to the first node, the second node, the third node, the first power terminal and the second power terminal, respectively, and configured to generate the drive current for driving the corresponding one of the plurality of second light-emitting devices according to signals of the first node, the second node and the third node;

the first threshold compensation sub-circuit, which is coupled to a first scanning signal terminal, the first node and the third node, respectively, and configured to perform threshold compensation on the first drive control sub-circuit under control of the first scanning signal terminal;

the first light emission control sub-circuit, which is coupled to the first power terminal, a first light emission control signal terminal, the second node and the third node, respectively, and configured to connect the first power terminal and the second node and connect the third node and the fourth node under control of the first light emission control signal terminal;

the first data writing sub-circuit, which is coupled to the first scanning signal terminal, a first data signal terminal and the second node, respectively, and configured to provide a data signal of the first data signal terminal to the second node under control of the first scanning signal terminal; and the first storage sub-circuit, which is coupled to the first power terminal and the first node, respectively, and configured to store data signals.

17. A driving method of the pixel driving circuit of claim 16, comprising:

in a first time period, controlling a first drive control circuit to generate a drive current for driving a corresponding second light-emitting device, and controlling the first drive control circuit to be disconnected from the corresponding second light-emitting device when the drive current moves between a second drive control circuit and a first wire; and in a second time period, controlling the path between the first drive control circuit and the corresponding second light-emitting device conducting.

18. The driving method of claim 17, wherein in a first time period, controlling a first drive control circuit to generate a drive current for driving a corresponding second light-emitting device, and controlling the first drive control circuit to be disconnected from the corresponding second light-emitting device when the drive current moves between a second drive control circuit and a first wire comprises:

in a first sub-time period, applying an effective signal to a first reset control terminal;

in a second sub-time period, applying effective signals to a first scanning signal terminal, a second reset control terminal and a second light emission control signal terminal; and in a third sub-time period, stopping applying the effective signal to the second light emission control signal terminal, and applying an effective signal to a first light emission control signal terminal.

19. The driving method of claim 18, wherein an effective signal is applied to the first light emission control signal terminal after the effective signal applying to the second light emission control signal terminal is stopped.

* * * * *